US011133901B2

(12) United States Patent
Lee et al.

(10) Patent No.: US 11,133,901 B2
(45) Date of Patent: Sep. 28, 2021

(54) DOWNLINK CONTROL CHANNEL IN WIRELESS SYSTEMS

(71) Applicant: IDAC Holdings, Inc., Wilmington, DE (US)

(72) Inventors: Moon-il Lee, Melville, NY (US); Paul Marinier, Brossard (CA); Diana Pani, Montreal (CA); Benoit Pelletier, Roxboro (CA); Ghyslain Pelletier, Montreal (CA); Marian Rudolf, Vienna (AT)

(73) Assignee: IDAC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 15/754,101

(22) PCT Filed: Aug. 25, 2016

(86) PCT No.: PCT/US2016/048558
§ 371 (c)(1),
(2) Date: Feb. 21, 2018

(87) PCT Pub. No.: WO2017/035305
PCT Pub. Date: Mar. 2, 2017

(65) Prior Publication Data
US 2018/0254794 A1 Sep. 6, 2018

Related U.S. Application Data

(60) Provisional application No. 62/209,797, filed on Aug. 25, 2015.

(51) Int. Cl.
*H04L 5/00* (2006.01)
*H04J 11/00* (2006.01)
*H04W 72/04* (2009.01)

(52) U.S. Cl.
CPC ........ *H04L 5/0007* (2013.01); *H04J 11/0069* (2013.01); *H04L 5/001* (2013.01);
(Continued)

(58) Field of Classification Search
CPC .............................. H04B 1/50; H04J 11/0069
See application file for complete search history.

(56) References Cited

U.S. PATENT DOCUMENTS

2010/0067445 A1 3/2010 Rinne et al.
2010/0331030 A1 12/2010 Nory et al.
(Continued)

FOREIGN PATENT DOCUMENTS

JP 2014511589 A 5/2014
WO WO 2010016255 A1 2/2010
(Continued)

OTHER PUBLICATIONS

3rd Generation Partnership Project, R1-123303, "Motivation, Requirements and Design for ePCFICH", Fujitsu, 3GPP TSG RAN WG1 Meeting #70, Qingdao, China, Aug. 13-17, 2012, pp. 1-5.
(Continued)

*Primary Examiner* — Gary Mui
(74) *Attorney, Agent, or Firm* — Yin Shao

(57) ABSTRACT

Systems, methods, and instrumentalities may be disclosed for implementing a flexible radio access communication system. A flexible radio access communication system may be supported using spectrum of varying size, including aggregation of non-adjacent carriers in the same and/or in different frequency bands. A wireless transmit/receive unit (WTRU) may receive a first transmission via a common downlink control channel. The first transmission may include first control information. The first control information may include information regarding the configuration of a first dedicated downlink control channel of one or more
(Continued)

dedicated control channels. The WTRU may receive a second transmission via the first dedicated downlink control channel of the dedicated control channels. The second transmission may include second control information. The second control information may be associated with a transmission of a first transmission type. The dedicated downlink control channels may be used for providing control information associated with different types of transmissions.

20 Claims, 16 Drawing Sheets

(52) U.S. Cl.
CPC ......... *H04L 5/0053* (2013.01); *H04W 72/042* (2013.01); *H04W 72/0453* (2013.01)

(56) References Cited

U.S. PATENT DOCUMENTS

| | | |
|---|---|---|
| 2011/0243090 A1 | 10/2011 | Grovlen et al. |
| 2012/0250641 A1 | 10/2012 | Sartori et al. |
| 2013/0064216 A1 | 3/2013 | Gao et al. |
| 2013/0114517 A1 | 5/2013 | Blankenship et al. |
| 2013/0114587 A1* | 5/2013 | Khoryaev .......... H04L 5/0094 370/343 |
| 2013/0157669 A1 | 6/2013 | Turtinen et al. |
| 2013/0242882 A1* | 9/2013 | Blankenship ....... H04W 72/042 370/329 |
| 2014/0011506 A1* | 1/2014 | McNamara .......... H04L 5/0039 455/450 |
| 2014/0036820 A1* | 2/2014 | McNamara .......... H04L 5/0007 370/329 |
| 2014/0036878 A1 | 2/2014 | McNamara et al. |
| 2014/0056279 A1* | 2/2014 | Chen ................ H04W 52/04 370/330 |
| 2014/0112285 A1* | 4/2014 | Darwood ............ H04W 72/042 370/329 |
| 2014/0126498 A1* | 5/2014 | Koorapaty ............ H04L 5/0098 370/329 |
| 2014/0241234 A1 | 8/2014 | Zhu et al. |
| 2014/0254420 A1* | 9/2014 | Kim ................... H04L 5/001 370/252 |
| 2014/0307698 A1* | 10/2014 | Beale .................. H04L 5/0044 370/329 |
| 2014/0341175 A1* | 11/2014 | Beale .................. H04L 5/0007 370/330 |
| 2014/0376457 A1 | 12/2014 | Feng et al. |
| 2015/0117356 A1 | 4/2015 | Kim et al. |
| 2015/0173101 A1* | 6/2015 | Webb .................. H04W 72/12 370/329 |
| 2015/0215923 A1 | 7/2015 | Jha et al. |
| 2015/0237459 A1* | 8/2015 | Webb .................. H04L 5/0007 370/312 |
| 2015/0296488 A1* | 10/2015 | Shimezawa ....... H04W 72/0406 370/329 |
| 2015/0365945 A1* | 12/2015 | Morioka ............... H04L 5/0064 370/329 |
| 2016/0043849 A1* | 2/2016 | Lee ..................... H04W 72/042 370/329 |
| 2016/0157232 A1* | 6/2016 | Martin ................. H04W 76/10 370/329 |
| 2017/0367058 A1* | 12/2017 | Pelletier ........... H04W 56/0045 |
| 2018/0206214 A1* | 7/2018 | Bendlin ............. H04W 72/042 |
| 2018/0206217 A1* | 7/2018 | Martin ............... H04W 72/044 |
| 2018/0242317 A1* | 8/2018 | Marinier ............ H04W 72/042 |

FOREIGN PATENT DOCUMENTS

| | | |
|---|---|---|
| WO | WO 2014045899 A1 | 3/2014 |
| WO | WO 2015022092 A1 | 2/2015 |

OTHER PUBLICATIONS

3rd Generation Partnership Project, R1-123585, "Need for Dynamic Indication of ePDCCH PRB Pairs", Renesas Mobile Europe Ltd., 3GPP TSG-RAN WG1 Meeting #70, Qingdao, China, Aug. 13-17, 2012, 4 pages.
3rd Generation Partnership Project, TS 36.213 V12.6.0, "Technical Specification Group Radio Access Network, Evolved Universal Terrestrial Radio Access (E-UTRA), Physical Layer Procedures (Release 12)", Jun. 2015, 241 pages.
3rd Generation Partnership Project, TS 36.300 V12.5.0, "Technical Specification Group Radio Access Network, Evolved Universal Terrestrial Radio Access (E-UTRA) and Evolved Universal Terrestrial Radio Access Network (E-UTRAN),Overall Description, Stage 2 (Release 12)", Mar. 2015, 251 pages.
3rd Generation Partnership Project, TS 36.321 V12.6.0, "Technical Specification Group Radio Access Network, Evolved Universal Terrestrial Radio Access (E-UTRA), Medium Access Control (MAC) Protocol Specification (Release 12)", Jun. 2015, 77 pages.
3rd Generation Partnership Project, TS 36.331 V12.6.0, "Technical Specification Group Radio Access Network, Evolved Universal Terrestrial Radio Access (E-UTRA), Radio Resource Control (RRC), Protocol Specification (Release 12)", Jun. 2015, 449 pages.

* cited by examiner

DOWNLINK CONTROL CHANNEL IN WIRELESS SYSTEMS

This application is the National Stage entry under 35 U.S.C. § 371 of Patent Cooperation Treaty Application PCT/US2016/048558, filed Aug. 25, 2016, which claims the benefit of U.S. Provisional Patent Application No. 62/209,797, filed Aug. 25, 2015, the contents of which are hereby incorporated by reference herein.

CROSS REFERENCE

This application claims the benefit of U.S. Provisional Application No. 62/209,797 filed on Aug. 25, 2015, which is incorporated herein by reference as if fully set forth.

BACKGROUND

Orthogonal frequency division multiplexing (OFDM) may be a signal format used for data transmissions in long term evolution (LTE) and IEEE 802.11 communication systems. OFDM may divide a spectrum into multiple parallel orthogonal subbands. A subcarrier may be shaped using a rectangular window in the time domain leading to sinc-shaped subcarriers in the frequency domain. OFDMA may benefit from frequency synchronization and tight management of uplink timing alignment within the duration of the cyclic prefix to maintain orthogonality between signals and to reduce inter-carrier interference. Such synchronization may not be well-suited in a system in which a wireless transmit/receive unit (WTRU) is connected to multiple access points simultaneously. Additional power reduction may be applied to uplink transmissions for compliance with spectral emission guidelines to adjacent bands, e.g., in the presence of aggregation of fragmented spectrum for the WTRU's transmissions.

SUMMARY

A wireless communication system may enable flexible spectrum usage, deployment strategies, and operation. A wireless/transmit receive unit (WTRU) and/or one or more base station devices/access points may be configured to utilize spectrum of varying size, for example including aggregation of non-adjacent carriers in the same and/or in different frequency bands (e.g., licensed or unlicensed), in order to implement a flexible radio access communication system. The WTRU and/or base station device may utilize one or more of narrowband and wideband transmissions in order to implement a flexible radio access communication system. A WTRU and/or base station device may utilize one or more (e.g., different) duplexing methods in order to implement a flexible radio access communication system. For time-division duplexing (TDD), the WTRU and/or base station device may utilize dynamically variable DL/UL allocation in order to implement a flexible radio access communication system. The WTRU and/or base station device may utilize variable TTI lengths in order to implement a flexible radio access communication system. The WTRU and/or base station device may utilize scheduled and unscheduled transmissions in order to implement a flexible radio access communication system. The WTRU and/or base station device may utilize synchronous and asynchronous transmissions in order to implement a flexible radio access communication system. The user plane may be separated from the control plane. The WTRU and/or base station device may utilize multi-node connectivity in order to implement a flexible radio access communication system.

A WTRU and/or base station device may utilize resource elements in order to implement a flexible radio access communication system. Different types of resource elements may be defined, determined, and/or used. For example, resource elements (REs) may be defined, determined, and/or used. Different types of REs may be defined, determined, and/or used for different types of transmissions. Different types of REs may be defined, determined, and/or used based on one or more of a frequency space and/or a time length. A resource block (RB) may be defined, determined, and/or used. For example, an RB may comprise one or more resource elements. One or more (e.g., different) types of RBs may be defined, determined, and/or used, for example, for different types of transmissions. For example, one or more RB may be defined, determined, and/or used, depending on which types of one or more REs are comprised within the RB. Information relating to the determined RB type may be sent to a wireless transmit/receive unit (WTRU). For example, a WTRU may receive information relating to the determined RB type from a base state device.

A WTRU and/or base station device may utilize flexible physical resource definition information in order to implement a flexible radio access communication system. For example, a WTRU may receive flexible physical resource definition information from a base station device. A WTRU may receive RE and/or RB definitions (e.g. RE and/or RB definitions with flexible structure) from a base state device. A WTRU may receive control channel resource unit definition information. For example, a WTRU may receive control resource element (CRE) and/or control resource element group (CREG) definition information in order to configure and/or implement a flexible radio access communication system. By using flexible resource definitions (e.g., CREs, CREGs, etc.), the WTRU may be configured to dynamically and/or semi-statically utilize different resource types, for example for different types of transmissions and/or transmission for different purposes/appellations/use cases. Different types of transmissions, such as using different waveform types and/or different RF processing chains, may be used depending on the resource type.

A WTRU and/or base station device may utilize control channel resource configuration information in order to implement a flexible radio access communication system. For example, a WTRU may receive control channel resource configuration information from a base station device. The control channel resource configuration information may be based on a service type. For example, control channel resource configuration information may be based on a hierarchical control channel structure, a flexible control resource configuration, and/or a search space configuration. The search space configuration may be provided according to a service type and/or collision handling when two or more search spaces are used.

A WTRU and/or base station device may utilize control information in order to configure and/or implement a flexible radio access communication system. For example, a WTRU may receive cyclic redundancy check (CRC) attachment information from a base station device, based on service type and/or based on a payload size. The WTRU may receive start and/or stop indications (e.g., for repetitive transmission), for example, from a base station device.

A WTRU and/or base station device may utilize WTRU reporting information. For example, a WTRU and/or base station device may utilize WTRU reporting information in order to configure and/or implement a flexible radio access communication system. For example, a WTRU and/or base station device may utilize WTRU reporting information for link adaptation of the control channel. A WTRU and/or base station device may utilize control channel processing time reporting information in order to configure and/or implement a flexible radio access communication system. The WTRU and/or base station device may utilize a preferred search space and/or CC candidate reporting information in order to configure and/or implement a flexible radio access communication system.

A WTRU and/or a base station devices may use a transmission scheme in order to implement a flexible radio access communication system. For example, a WTRU and/or a base station device may use a CP-based OFDM transmission scheme that may employ a downlink physical layer. The downlink physical layer may be modified in pilot signal density and/or location. The WTRU and/or a base station device may use a downlink transmission scheme that may be based on a multicarrier waveform.

A WTRU and/or a base station device may use spectrum flexibility. Spectrum flexibility may enable the WTRU and/or the base station device to be deployed in different frequency bands with different characteristics. For example, a high degree of spectrum flexibility may enable deployment in different frequency bands with different duplex arrangements. A WTRU and/or a base station device may achieve bandwidth flexibility in a flexible radio access wireless communication system. Bandwidth flexibility may be achieved because RF requirements for an operating bandwidth (e.g., a given maximum operating bandwidth) in a band may be met without the introduction of additional allowed channel bandwidths for that operating band.

A WTRU and/or a base station device may utilize flexible deployment strategies, and/or flexible operations. Flexible deployment strategies and/or flexible operations may include flexible spectrum allocation. Flexible deployment strategies and/or flexible operations may enable deployment in different and/or variable sizes of available spectrum, including contiguous and non-contiguous spectrum allocations in the same or different bands. A WTRU and/or a base station device may support narrowband and/or wideband. A WTRU and/or a base station device may support one or more (e.g., different) duplexing methods.

A WTRU and/or a base station device may organize downlink and/or uplink transmissions into radio frames. The radio frames may be characterized by one or more fixed aspects (e.g., location of downlink control information) and/or one or more varying aspects (e.g., transmission timing, supported types of transmissions). A basic time interval (BTI) may be expressed in terms of an integer number of one or more symbols. A symbol duration may be a function of the subcarrier spacing applicable to the time-frequency resource. For FDD, subcarrier spacing may differ between the uplink carrier frequency $f_{UL}$ and the downlink carrier frequency $f_{DL}$ for a given frame. A transmission time interval (TTI) may be the minimum time supported by the system between transmissions (e.g., consecutive transmissions).

A WTRU and/or a base station device may support a scheduling function in the MAC layer. Scheduling modes that may be supported may include network-based scheduling and/or WTRU-based scheduling. For network-based scheduling and/or WTRU-based scheduling, scheduling information may be valid for one or more TTIs. Network-based scheduling may enable the network to manage radio resources (e.g., the available radio resources assigned to different WTRUs). For example, network-based scheduling may enable the network to manage available radio resources assigned to different WTRUs to optimize the sharing of such resources. WTRU-based scheduling may enable the WTRU to access (e.g., opportunistically access) uplink resources with minimal latency on a per-need basis. WTRU-based scheduling may enable the WTRU to access uplink resources within a set of shared and/or dedicated uplink resources (e.g., dynamically or fixed uplink resources) assigned by the network.

A WTRU and/or a base station device may use a resource element (RE) as a resource unit (e.g., a minimum resource unit) in a physical resource grid. One or more of REs may be defined in a physical resource grid. An RE may include one or more of the following: a subcarrier of a multi-carrier waveform in a time symbol, a time symbol, a sequence of a modulated symbol in which multiple sequences may be used to carry data symbols, and/or a resource unit that may carry a data symbol.

A WTRU and/or a base station device may use one or more downlink control channels (and/or downlink control channel types). For example, one or more downlink control channels (and/or downlink control channel types) may be used based on one or more of a traffic type for a data channel, an information type carried in the control channel, a reference signal, RB types used for the downlink control channel transmission, SOM, and/or WTRU types (or categories) that may receive or monitor the control channel. A downlink control channel may be interchangeably used as a downlink control channel type, control channel, and control channel type.

A WTRU and/or a base station device may use a downlink control channel based on a traffic type of the data channel scheduled by the downlink control channel. A first type of downlink control channel may be used for a first traffic type, and a second type of downlink control channel may be used for a second traffic type. The traffic type may be a data traffic that may use a low latency connection. The traffic type may be a data traffic that may use a narrowband transmission. The traffic type may be a data traffic that may use a transmission with a high reliability. The traffic type may be a control traffic that may carry broadcast or multicast information. The traffic type may be a control and/or data traffic that may be transmitted and/or received between WTRUs.

A WTRU and/or a base station device may use a downlink control channel based on a WTRU capability. A first downlink control channel type may be used for a WTRU with a limited WTRU capability. A second downlink control channel type may be used for a WTRU with a full WTRU capability. The WTRU capability may include a supportable bandwidth, a number of receive antennas, a number of transmit antennas, a receiver beamforming capability, and/or a multiple antenna receiver type. A downlink control channel may be defined, determined, and/or or used based on a reference signal. For example, a first downlink control channel may be associated with a first type of reference signal, and/or a second downlink control channel may be associated with a second type of reference signal (e.g., WTRU-specific).

A WTRU and/or a base station device may define a control resource element (CRE) with a group of one or more REs. The CRE may be used interchangeably with resource element group (REG) and enhanced REG (EREG). A CRE may be defined and/or determined with a fixed number of REs. The available RE for a CRE may be referred to as an RE, which may be used for the control channel. The configuration of a higher priority signal may be known to a WTRU.

A CRE may be defined with a variable number of REs. For example, the number of REs per CRE may be determined based on an RE type for the REs in the associated CRE. A CRE that may include a first type of REs may be defined with a first number of REs. A CRE that may include a second type of REs may be defined with a second number of REs. The number of REs per CRE may be determined based on an RB type (e.g., based on an RB type of an RB in which the CRE may be located). A CRE in a first type of RB may be defined with a first number of REs. A CRE in a second type of RB may be defined with a second number of REs. One or more CREs may be defined for a time cycle. The number of REs per CRE may be determined based on a number of available REs within an RB.

A WTRU and/or a base station device may use one or more CRE types. The CRE type may be determined based on a control channel type and/based on an RE type. A CRE type for a first control channel may be defined and/or configured with REs located in the same time symbol. A CRE type for a second control channel may be defined and/or configured with REs located in the same subcarrier. The CRE type may be determined based on an RB type (e.g., based on an RB type of the configured RBs for the control channel). One or more RBs may be configured for a control channel. The CRE type may be determined based on an RE type of REs that may be grouped to form a CRE. For example, if a CRE is defined or configured with REs that may be a defined RE type, the CRE type may be determined based on the RE type of the REs associated with the CRE. The CRE type may be determined based on a configuration, a WTRU capability and/or category, a traffic type, a CP length used for a waveform, and/or a subframe type.

A WTRU and/or a base station device may define and/or configure a control resource element group (CREG). For example, a control resource element group (CREG) may be defined and/or configured with a group of one or more CREs. A CREG may be used interchangeably with control channel element (CCE) and/or enhanced CCE (ECCE). CREs with a same type may be grouped to form a CREG. A CREG type may be determined based on the CRE type. CREs may be grouped to form a CREG.

A WTRU and/or a base station device may define and/or use one or more CREG types. The CREG type for a downlink control information (DCI) transmission and/or a downlink control channel may be determined based on a channel type (e.g., the associated channel type). A WTRU and/or a base station device may use a reference signal to demodulate a CRE and/or a CREG. One or more reference signal structures may be used for a downlink control channel. A first reference signal structure may be a cell-specific reference signal. A cell-specific reference signal may be used for one or more downlink channels. A second reference signal structure may be a dedicated reference signal. A dedicated reference signal may be used for a specific downlink channel. A dedicated reference signal may be used for a data channel. A dedicated reference signal may be transmitted in a localized resource. A dedicated reference signal may be located within a resource that may be allocated, received, and/or decoded by a WTRU.

A WTRU and/or a base station device may use a hierarchical downlink control channel structure. A common downlink control channel and/or one or more dedicated downlink control channel may be used. The common DL control channel may be transmitted to and/or received by one or more WTRUs, regardless of service type, traffic type, transmission type, WTRU category, and/or WTRU capabilities. The dedicated DL control channel may be transmitted to and/or received by a WTRU with a defined service type, traffic type, transmission type, WTRU category, and/or WTRU capability.

A nominal system bandwidth may be defined with a subset of a total system bandwidth. A frequency band other than the nominal system bandwidth may be used based on configurations indicated or received from the nominal system bandwidth. A common DL control channel may be transmitted from a base station device (e.g., eNB) and/or received by a WTRU in a nominal system bandwidth. A dedicated DL control channel may be configured in a frequency band within a total system bandwidth. For example, a dedicated DL control channel for a control channel type may be located in a frequency band used and/or configured for the traffic type associated with the control channel type. A dedicated DL control channel for a traffic type may be located in the frequency band assigned and/or used for the traffic type. One or more dedicated DL control channels may be located in a different frequency band that may be associated with the traffic type. A time/frequency location of a dedicated DL control channel may be predefined within a frequency band that may be configured for a traffic type and/or a service type.

A nominal system bandwidth may be located in a different frequency region based on one or more of a service type, a traffic type, WTRU categories, and/or a WTRU capability. For example, the nominal system bandwidth for a broadband service may be located in a different frequency region from the frequency region for a massive MTC (mMTC) service (e.g., mMTC 1212). A WTRU may find a nominal system bandwidth with a defined synchronization signal. The synchronization signal type may be determined based on one or more of a service type, a traffic type, WTRU categories, and/or a WTRU capability.

A WTRU and/or a base station device may use a search space. For example, a search space may be used wherein one or more control channel (CC) candidates may be located. The number of CC candidates in a search space may be determined based on one or more of service types and/or traffic types. The number of CC candidates in a search space may be determined based on a WTRU capability and/or category. The WTRU capability and/or category may include one or more of supportable uplink and/or downlink bandwidth, number of carriers, number of transmit and/or receive antennas, and/or receive processing time. The number of CC candidates in a search space may be determined based on a time and/or frequency resource, and/or the number of CC candidates in a search space may be determined based on an associated reference signal type. The reference signal type may be replaced by CRE type, CREG type, or RB type. A search space associated with a defined service type may include a smaller number of CC candidates. A search space associated with another service type may include a larger number of CC candidates. A search space associated with a defined service type may include CC candidates that may use a same type of CRE and/or CREG.

A WTRU and/or a base station device may use downlink control information (DCI) in order to implement a flexible radio access communication system. The DCI may be used to schedule a downlink data and/or an uplink data. DCI may include one or more of a resource allocation of the associated data channel; a modulation and coding scheme; a starting BTI; an ending BTI; a transport block size; a HARQ process number; a new data indicator; a carrier indicator; a number of spatial layers; and/or an uplink power control field.

One or more search spaces may be configured for a WTRU in order to implement a flexible radio access communication system. The WTRU may report associated channel status information for the configured search spaces. The WTRU may report a received signal power level of a (e.g., each) configured search space. The WTRU may report a search space which may have a highest receives signal power level. The WTRU may report a preferred CC candidate index within a search space. The WTRU may report its capability of downlink control channel processing time.

Systems, methods, and instrumentalities may be disclosed for implementing a flexible radio access communication system. A flexible radio access communication system may be supported using spectrum of varying size, including aggregation of non-adjacent carriers in the same and/or in different frequency bands. A wireless transmit/receive unit (WTRU) may receive a first transmission via a common downlink control channel. The first transmission may include first control information. The first control information may include information regarding the configuration of a first dedicated downlink control channel of one or more dedicated control channels. The WTRU may receive a second transmission via the first dedicated downlink control channel of the dedicated control channels. The second transmission may include second control information. The second control information may be associated with a transmission of a first transmission type. The dedicated downlink control channels may be used for providing control information associated with different types of transmissions.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
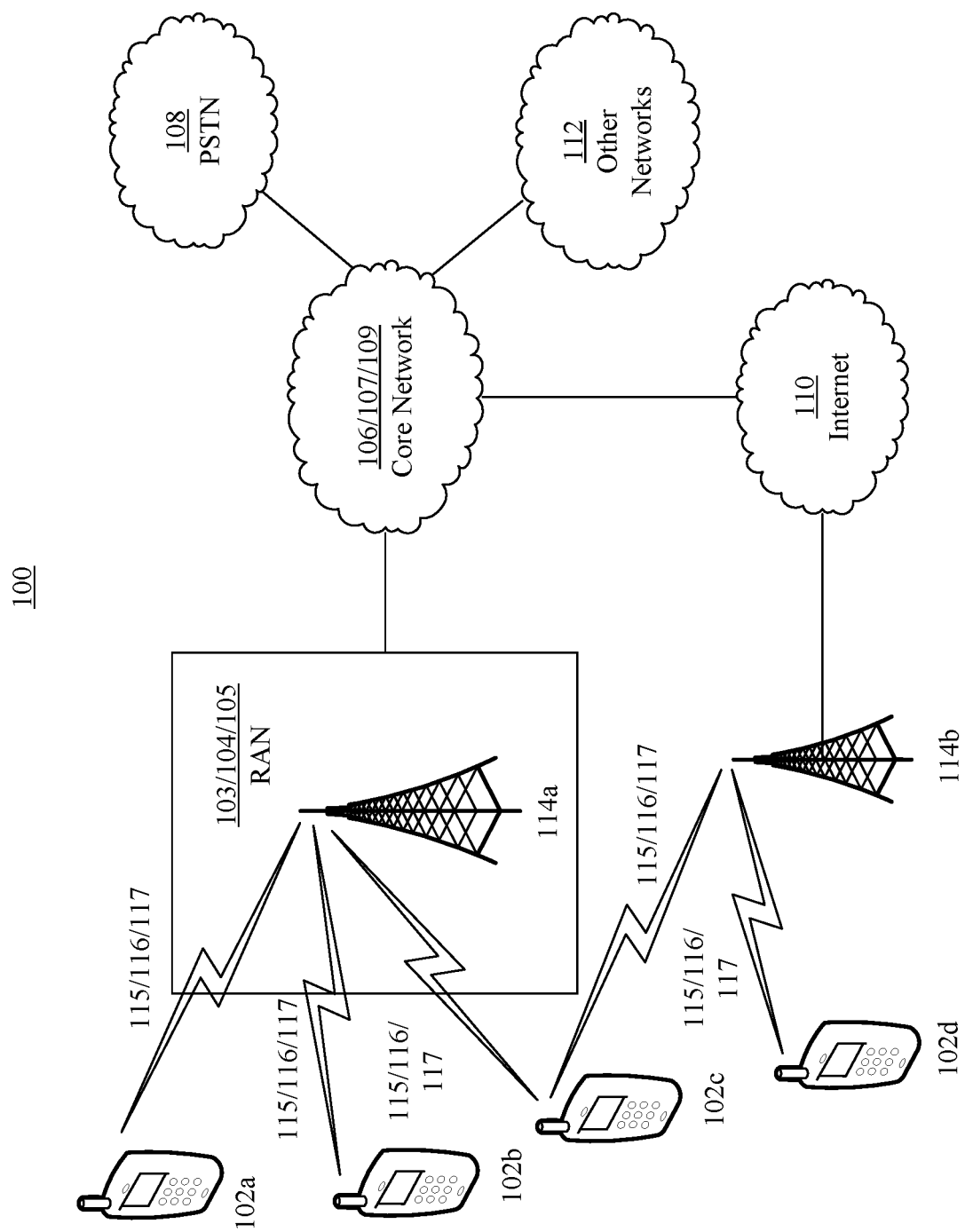
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with one or more of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
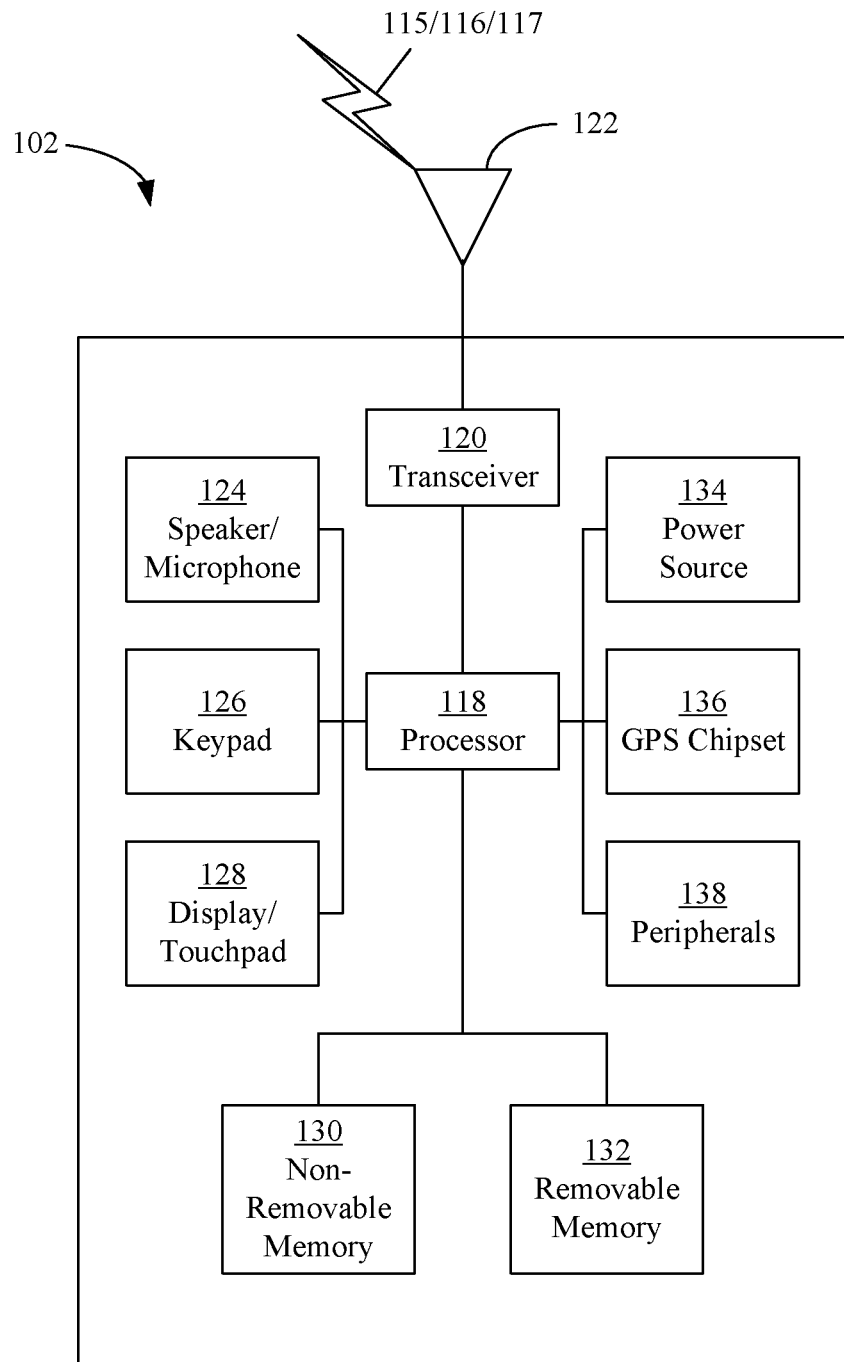
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip. A processor, such as the processor 118, may include integrated memory (e.g., WTRU 102 may include a chipset that includes a processor and associated memory). Memory may refer to memory that is integrated with a processor (e.g., processor 118) or memory that is otherwise associated with a device (e.g., WTRU 102). The memory may be non-transitory. The memory may include (e.g., store) instructions that may be executed by the processor (e.g., software and/or firmware instructions). For example, the memory may include instructions that when executed may cause the processor to implement one or more of the implementations described herein.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130, the removable memory 132, and/or memory integrated with the processor 118. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
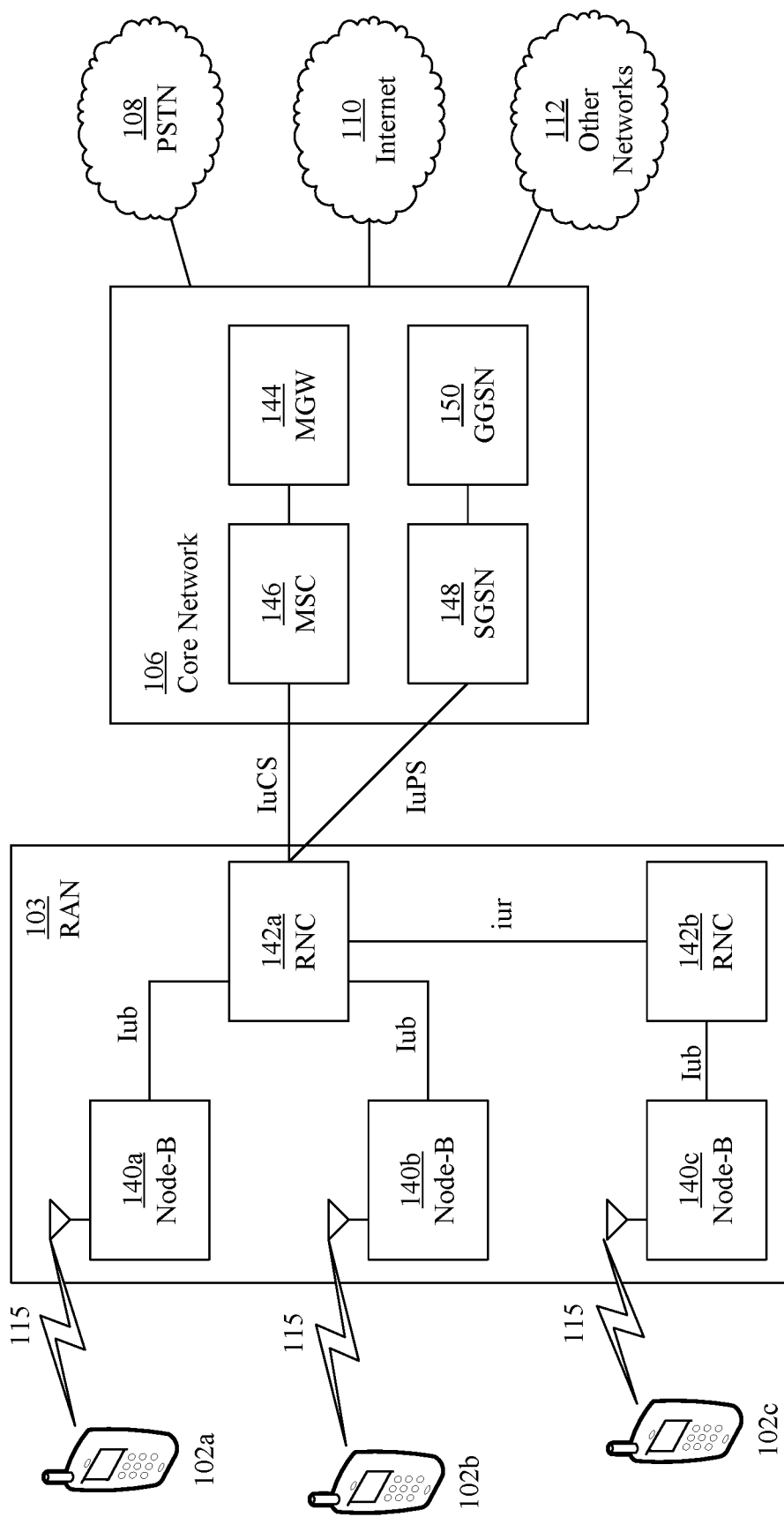
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
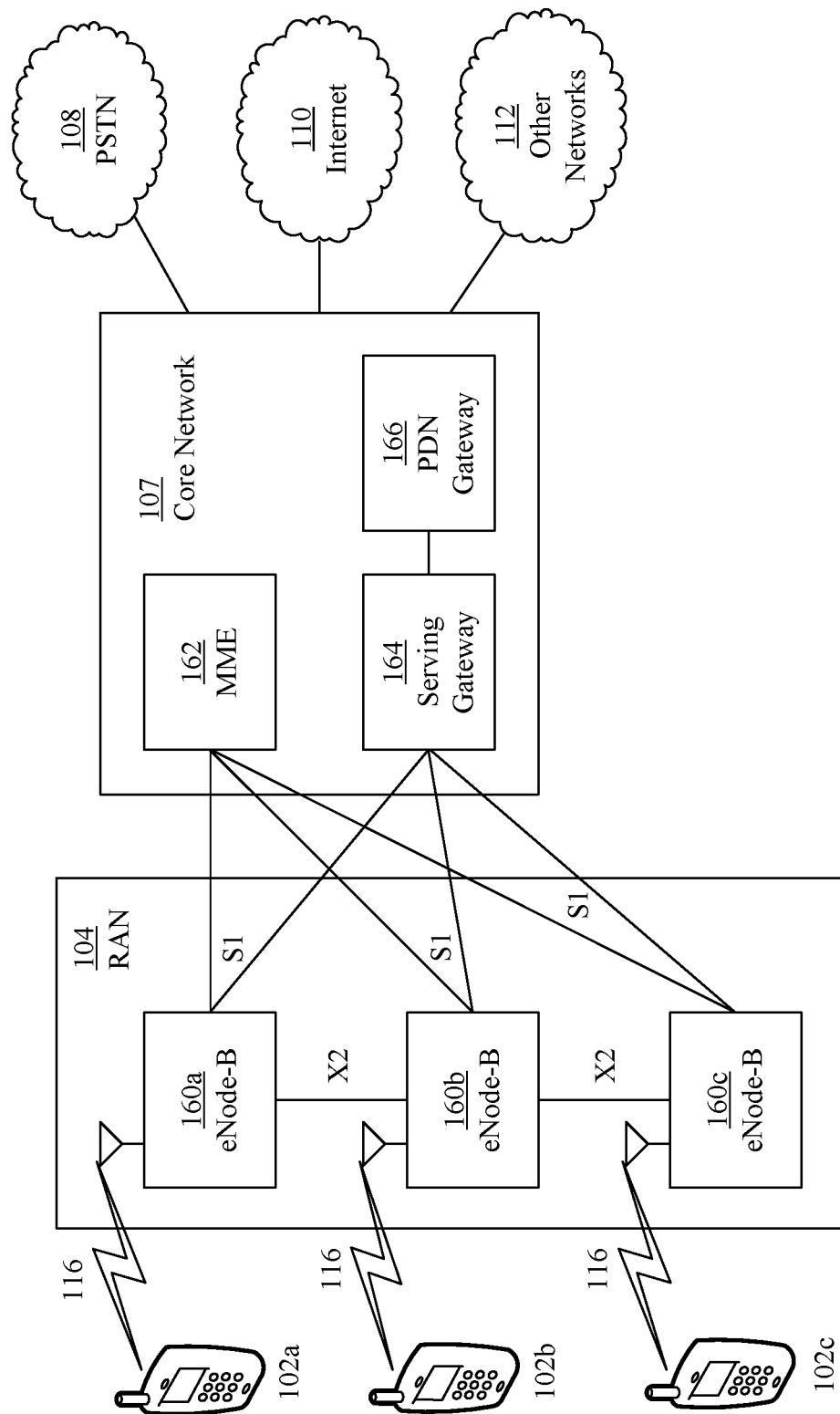
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
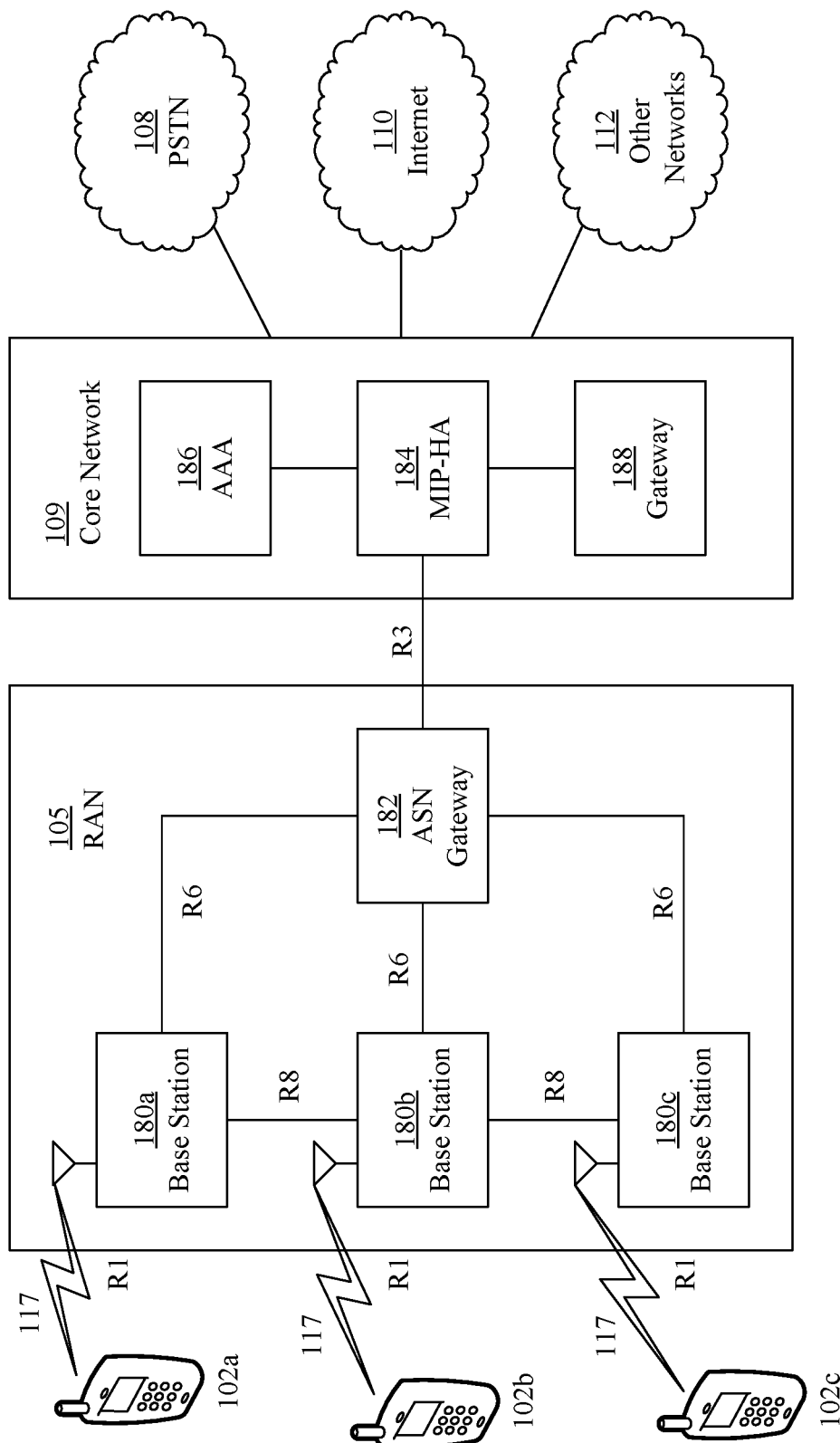
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

For emerging next generation wireless communication systems (e.g., such as 5G systems), the air interface (e.g., the radio interface between a WTRU and one or more base station units and/or one or more other WTRUSs) may be designed to attempt to enable improved broadband (IBB) performance, support industrial control and communications (ICC) application, support vehicular applications (V2X), and/or support massive machine-type communications (mMTC). In order to support these diverse application types, a flexible wireless communication architecture for transmissions between different devices in the network may be used.

To support the flexible operation, baseband filtering of frequency-domain waveforms may be utilized by a WTRU and/or a base station device. Baseband filtering of frequency-domain waveforms may enable aggregation of spectrum within a given RF transceiver path. For example, baseband filtering of frequency-domain waveforms may enable effective aggregation of up to 150-200 MHz total spectrum within a given RF transceiver path. Aggregation of spectrum across operating bands (e.g., widely separated operating bands, such as 900 MHz and/or 3.5 GHz) may use multiple RF transceiver chains. For example, aggregation of spectrum across widely separated operating bands may use multiple RF transceiver chains due to antenna size constraints and/or amplifier optimization design constraints. A WTRU implementation may include one or more (e.g., three) RF transceiver paths. For example, a WTRU implementation may include an RF transceiver for a first frequency region (e.g., an RF transceiver path below 1 GHz), an RF transceiver path for a second frequency region (e.g., an RF transceiver path for the 1.8-3.5 GHz frequency range), and an RF transceiver path for a third frequency region (e.g., an RF transceiver path for the 4-6 GHz frequency range). Massive MIMO antenna configurations may be utilized by the WTRU and/or the base station device to support the flexible operation. Massive MIMO antenna configurations may be natively supported. Multiple frequency bands with spectrum of one or more sizes (e.g., varying sizes) may be aggregated. For example, a base station device may aggregate multiple frequency bands with spectrum of one or more sizes (e.g., varying sizes). A base station device may aggregate multiple frequency bands with spectrum of one or more sizes to achieve data rates on the order of several tens of Mbps at cell edges to peak data rates of several Gbps. Typical data rates may be on the order of several hundreds of Mbps.

For one or more types of transmissions, a WTRU and/or a base station device may utilize ultra-low transmission latency in order to implement a flexible radio access communication system. For example, air interface latency (e.g., as low as 1 ms round trip time (RTT)) may be utilized by the WTRU and/or the base station device in order to implement a flexible radio access communication system. Air interface latency (e.g., as low as 1 ms round trip time (RTT)) may be supported by TTIs in the 100-250 µs range. Ultra-low access latency (e.g., the time from the initial system access until the completion of the transmission of the first user data plane unit) may be utilized by a WTRU and/or a base station device in order to implement a flexible radio access communication system. Mobility for speeds in the range of 0-500 km/h may be utilized by the WTRU and/or the base state device. IC and/or V2X may support a packet loss rate of less than $10e^{-6}$.

A WTRU and/or a base station device may utilize machine type communication (MTC) operation (such as narrowband operation) in order to implement a flexible radio access communication system. The WTRU and/or the base station device may utilize an air interface that may support narrowband operation (e.g., using less than 200 KHz), extended battery life (e.g., up to 15 years of autonomy), and/or minimal communication overhead for small and/or infrequent data transmissions. For example, the WTRU and/or the base station device may utilize an air interface that may support a low data rate in the range of 1-100 kbps with access latency of seconds to hours.

A WTRU and/or a base station device may utilize narrowband operation to support massive MTC (mMTC) operation. A link budget may be comparable to that of LTE extended coverage and/or the link budget may support MTC devices (e.g., a large number of MTC devices, such as up to 200 k/km$^2$). A link budget may be comparable to that of LTE extended coverage and/or may support a large number of MTC devices without adversely impacting spectral efficiency for one or more supported services (e.g., one or more other supported services).

A WTRU and/or a base station device may utilize a flexible radio access wireless communication system that may enable flexible spectrum usage, flexible deployment strategies, and/or flexible operation. The WTRU and/or the base station device may utilize flexible operation to support using spectrum of varying size. For example, the WTRU and/or the base station device may utilize flexible operation that may be supported using spectrum of varying size, including aggregation of non-adjacent carriers in the same and/or in different frequency bands (e.g., licensed or unlicensed). The WTRU and/or the base station device may utilize narrowband and/or wideband in order to implement a flexible radio access communication system. The WTRU and/or the base station device may utilize one or more (e.g., different) duplexing methods. For time-division duplexing (TDD), the WTRU and/or the base station device may utilize dynamically variable DL/UL allocation. The WTRU and/or the base station device may utilize variable TTI lengths. The WTRU and/or the base station device may utilize scheduled and unscheduled transmissions. The WTRU and/or the base station device may utilize synchronous and/or asynchronous transmissions. The user plane may be separated from the control plane. The WTRU and/or the base station device may utilize multi-node connectivity.

The wireless communication system (e.g., the flexible radio access communication system) described herein may integrate with and/or operate with legacy interfaces (or evolutions thereof). For example, the wireless communication system described herein may integrate with and/or operate with legacy interfaces, at least toward the legacy core network (CN) (e.g., the S1 interface, NAS) and eNBs (e.g., the x2 interface including dual connectivity with LTE). The wireless communication system described herein may enable legacy aspects. For example, the wireless communication system described herein may enable support for existing quality of service (QoS) and/or security mechanisms. The WTRU and/or the base station device may utilize D2D/sidelink operation. The WTRU and/or the base station device may utilize licensed assisted access (LAA) operation using LBT in order to implement a flexible radio access communication system. The WTRU and/or the base station device may utilize relaying.

The WTRU and/or the base station device may utilize orthogonal frequency division multiplexing (OFDM). OFDM may be a signal format used for data transmissions in long term evolution (LTE) and/or IEEE 802.11 communication systems. The WTRU and/or the base station device may utilize OFDM to divide a spectrum into multiple parallel orthogonal subbands. The WTRU and/or the base station device may shape a subcarrier using a rectangular window in the time domain leading to sinc-shaped subcarriers in the frequency domain. Orthogonal frequency division multiplexing access (OFDMA) may benefit from frequency synchronization and/or tight management of uplink timing alignment within the duration of the cyclic prefix. For example, OFDMA may benefit from frequency synchronization and/or tight management of uplink timing alignment within the duration of the cyclic prefix to maintain orthogonality between signals and/or to reduce inter-carrier interference. Such synchronization may not be well-suited in a system in which a wireless transmit/receive unit (WTRU) is connected to multiple access points simultaneously. Power reduction (e.g., additional power reduction) may be applied to uplink transmissions. For example, additional power reduction may be applied to uplink transmissions for compliance with spectral emission guidelines to adjacent bands (e.g., in the presence of aggregation of fragmented spectrum for the WTRU's transmissions).

More stringent RF guidelines for implementations of OFDM (e.g., CP-OFDM) may address some of the shortcomings of OFDM (e.g., CP-OFDM). For example, some of the shortcomings of OFDM (e.g., CP-OFDM) may be addressed by more stringent RF guidelines for implementations when operating using large amounts of contiguous spectrum that may not require aggregation. A CP-based OFDM transmission scheme may employ a downlink physical layer that may be modified in pilot signal density and/or location.

A WTRU and/or a base station device may utilize a downlink transmission scheme (e.g., a scheme that may be based on a multicarrier waveform) in order to implement a flexible radio access communication system. The multicarrier waveform may be characterized by high spectral containment (e.g., lower side lobes and/or lower out-of-band (OOB) emissions). Waveform candidates may include OFDM-OQAM and/or UFMC (UF-OFDM).

A WTRU and/or a base station device may utilize multicarrier modulation waveforms in order to implement a flexible radio access communication system. Multicarrier modulation waveforms may divide a channel into subchannels. Multicarrier modulation waveforms may modulate data symbols on subcarriers in the subchannels.

A WTRU and/or a base station device may apply a filter in the time domain per subcarrier to the OFDM signal. A filter may be applied in the time domain per subcarrier to the OFDM signal to reduce OOB. For example, with OFDM-OQAM, a filter may be applied in the time domain per subcarrier to the OFDM signal to reduce OOB. OFDM-OQAM may cause low interference to adjacent bands, may not need large guard bands, and/or may not require a cyclic prefix. OFDM-OQAM may be a popular FBMC technique.

The WTRU and/or the base station device may apply a filter in the time domain to the OFDM signal to reduce OOB emissions. For example, with UFMC (UF-OFDM), the WTRU and/or the base station device may apply a filter in the time domain to the OFDM signal to reduce OOB emissions. Filtering may be applied per subband. For example, filtering may be applied per subband to use spectrum fragments. Complexity may be reduced. UF-OFDM may be practical to implement. UF-OFDM may improve over OFDM. For example, UF-OFDM may improve over OFDM at the edges of the filtered spectrum.

Methods disclosed herein may be described with respect to OFDM-OQAM and/or UFMC (UF-OFDM) waveforms, but the methods described herein may be applied to other types of waveforms in a flexible radio access wireless communication system. For example, the disclosed subject matter may be disclosed in the context of OFDM-OQAM and/or UFMC (UF-OFDM) waveforms for purposes of illustration and not limitation.

A WTRU and/or the base station device may utilize multiple waveforms and/or different types of waveforms. By utilizing multiple waveforms and/or different types of waveforms, a WTRU and/or base station device may be able to perform multiplexing in frequency of signals with non-orthogonal characteristics. Non-orthogonal characteristics may include different subcarrier spacing and/or coexistence of asynchronous signals without the use of complex interference cancellation receivers. Aggregating fragmented pieces of spectrum in the baseband processing may be facilitated as a lower cost alternative to such aggregation as part of RF processing.

The WTRU and/or the base station device may utilize different waveforms that may coexist within one or more bands in order to implement a flexible radio access communication system. Different waveforms may coexist within the same band. The WTRU and/or the base station device may utilize mMTC narrowband (e.g., using SCMA). The WTRU and/or the base station device may combine different waveforms (e.g., CP-OFDM, OFDM-OQAM, and/or UF-OFDM) within the same band for one or more (e.g., all) aspects, for downlink transmissions, and/or for uplink transmissions.

The WTRU and/or the base station device may utilize an uplink transmission scheme that may use a waveform. For example, the WTRU and/or the base station device may utilize an uplink transmission scheme that may use the same or different waveform as used for downlink transmissions. Multiplexing of transmissions to and/or from WTRUs in the same cell may be based on FDMA and/or TDMA.

The WTRU and/or the base station device may utilize spectrum flexibility (e.g., a high degree of spectrum flexibility). Spectrum flexibility (e.g., a high degree of spectrum flexibility) may enable deployment in different frequency bands with different characteristics. For example, spectrum flexibility (e.g., a high degree of spectrum flexibility) may enable deployment in different frequency bands with different duplex arrangements. Spectrum flexibility (e.g., a high degree of spectrum flexibility) may enable deployment in different and/or variable sizes of available spectrum, including contiguous and non-contiguous spectrum allocations in the same or different bands. The WTRU and/or the base station device may utilize variable timing aspects. For example, the WTRU and/or the base station device may utilize variable timing aspects for multiple TTI lengths and/or asynchronous transmissions.

The WTRU and/or the base station device may utilize TDD and/or FDD duplexing schemes. For FDD operation, the WTRU and/or the base station device may utilize supplemental downlink operation using spectrum aggregation. FDD operation may support full-duplex FDD and/or half-duplex FDD operation. For TDD operation, the DL/UL allocation may be dynamic. For example, for TDD operation, the length of a downlink (DL) and/or an uplink (UL) transmission interval may be set per transmission opportunity rather than on a fixed DL/UL frame configuration.

Figure 2:
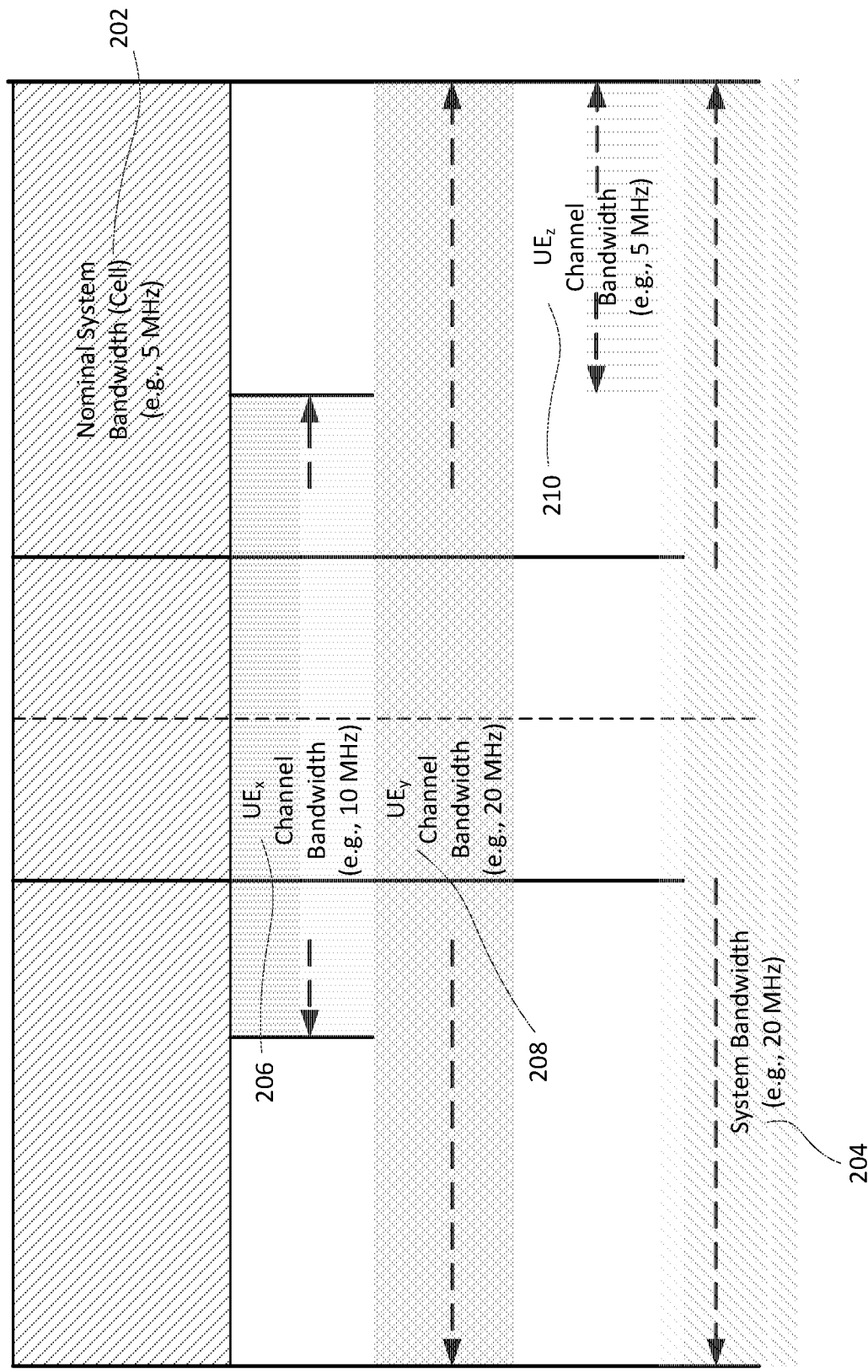
FIG. 2 illustrates an example of transmission bandwidths that may be used by a wireless transmit/receive unit (WTRU).

The WTRU and/or the base station device may utilize different transmission bandwidths on the uplink and downlink. For example, FIG. 2 illustrates an example spectrum deployment for supporting a flexible radio access wireless communication system As illustrated in FIG. 2, transmission bandwidths may range from a nominal system bandwidth 202 (e.g., 5 MHz) to a maximum value. The maximum value may correspond to the system bandwidth 204 (e.g., 20 MHz). For single carrier operations, example supported system bandwidths may include 5 MHz, 10 MHz, 20 MHz, 40 MHz, and/or 80 MHz. The WTRU and/or the base station device may utilize narrowband transmissions (e.g., up to 200 KHz) within the operating bandwidth for MTC devices.

The WTRU and/or the base station device may utilize system bandwidth in order to implement a flexible radio access communication system. System bandwidth may refer to the largest portion of spectrum that may be managed by the network for a given carrier. For a carrier, the portion that a WTRU supports (e.g., minimally supports) for cell acquisition, measurements, and/or initial access to the network may correspond to the nominal system bandwidth. The WTRU may be configured with a channel bandwidth that may be within the range of the system bandwidth (e.g., the entire system bandwidth). The WTRU's configured channel bandwidth may include the nominal part of the system bandwidth, as shown in FIG. 2. For example, the WTRU's configured channel bandwidth may include a UEx Channel Bandwidth 206 (e.g., 10 MHz), a UEy Channel Bandwidth 208 (e.g., 20 MHz), and/or a UEz Channel Bandwidth 210 (5 MHz).

A WTRU and/or base station device in a flexible radio access wireless communication system may be configured to utilize bandwidth in a flexible and/or dynamic manner. For example, a WTRU and/or a base station device may achieve bandwidth flexibility because RF requirements for an operating bandwidth (e.g., a given maximum operating bandwidth) in a band may be met without the introduction of additional allowed channel bandwidths for that operating band. RF requirements for a given maximum operating bandwidth in a band may be met without the introduction of additional allowed channel bandwidths for that operating band due to the efficient support of baseband filtering of the frequency domain waveform.

A WTRU and/or a base station device in a flexible radio access wireless communication system may utilize a physical layer. A physical layer may be band-agnostic and/or may support operation in licensed bands. For example, a physical layer may be band-agnostic and/or may support operation in licensed bands below 5 GHz and/or operation in the unlicensed bands in the range 5-6 GHz. For operation in the unlicensed bands, a WTRU and/or base station device may utilize an LBT Cat 4 based channel access framework (e.g., similar to LTE LAA).

A WTRU and/or a base station device in a flexible radio access wireless communication system may utilize a frequency division multiplexing (FDM) operation. Downlink control channels and/or signals may support frequency division multiplexing (FDM) operation. For example, a WTRU may acquire a downlink carrier by receiving transmissions using the nominal part of the system bandwidth. The WTRU may not be required to receive (e.g., initially required to receive) transmissions covering the entire bandwidth that is being managed by the network for the concerned carrier.

A WTRU and/or a base station device in a flexible radio access wireless communication system may utilize downlink data channels. Downlink data channels may be allocated over a bandwidth that may correspond to the nominal system bandwidth. For example, downlink data channels may be allocated over a bandwidth that may correspond to the nominal system bandwidth, without restrictions other than being within the WTRU's configured channel bandwidth. The network may operate a carrier with a system bandwidth (e.g., 12 MHz system bandwidth) using a nominal bandwidth (e.g., 5 MHz nominal bandwidth). Operating a carrier with a 12 MHz system bandwidth, using a 5 MHz nominal bandwidth, may allow devices supporting at most 5 MHz maximum RF bandwidth to acquire and/or access the system while allocating +10 to −10 MHz of the carrier frequency to other WTRUs supporting up to 20 MHz worth of channel bandwidth.

Figure 3:
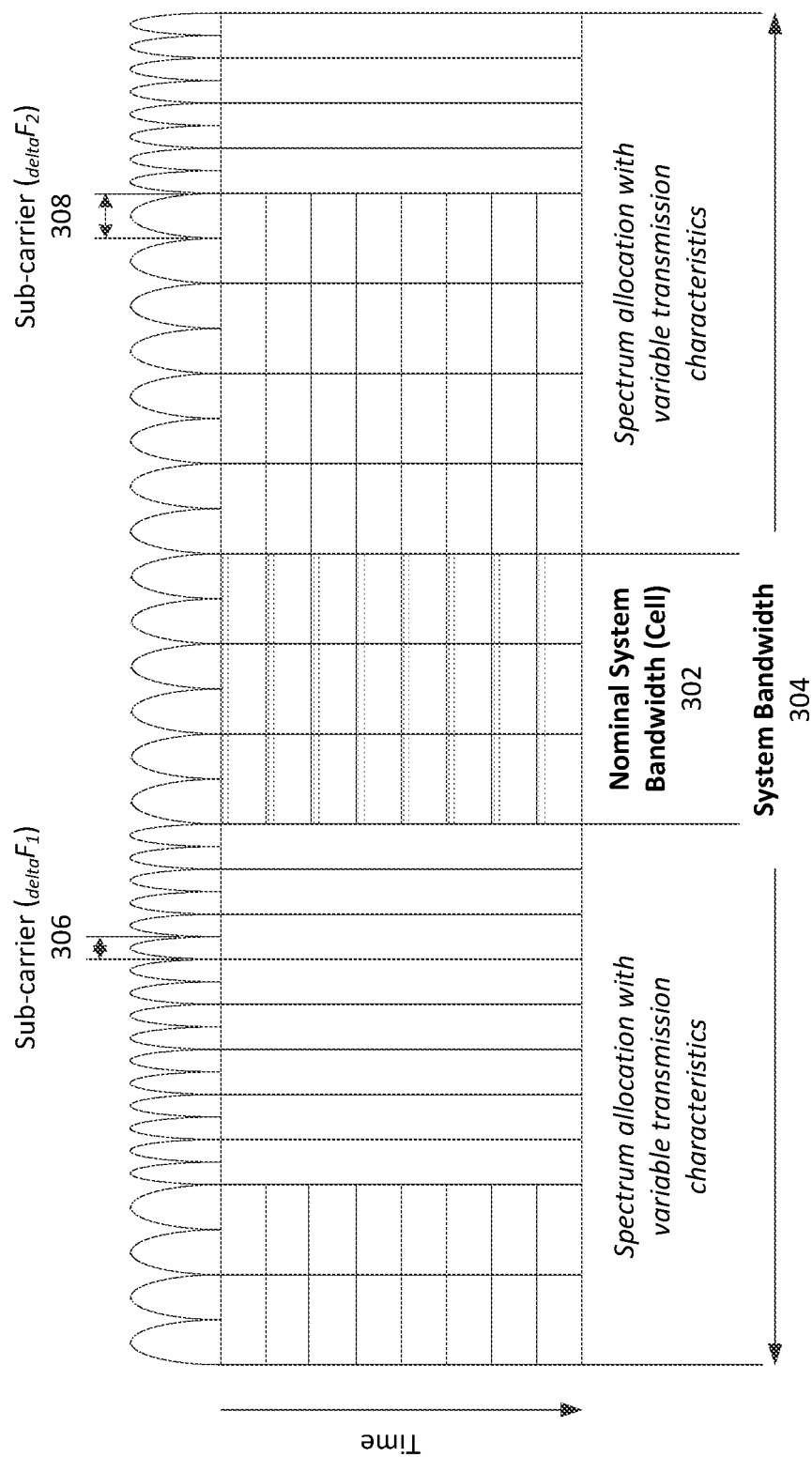
FIG. 3 illustrates an example of spectrum allocation.

FIG. 3 illustrates an example of spectrum allocation. For example, FIG. 3 illustrates an example of spectrum allocation utilized by a WTRU and/or a base station device over a Nominal System Bandwidth 302 (e.g., 5 MHz) and/or a System Bandwidth 304 (e.g., 20 MHz). One or more sub-carriers may be conceptually assigned to one or more modes of operation (e.g., SOM). For example, Sub-carrier 306 and/or Sub-carrier 308 may be conceptually assigned to one or more modes of operation (e.g., spectrum operating modes (SOMs)).

One or more spectrum operating modes (SOMs) can be used to fulfill one or more requirements for one or more transmissions. For example, a SOM may refer to a specific type of transmission scheme and/or a transmission scheme that is used for performing a certain-type of communication (e.g., a low latency communication, a high reliability communication, etc.). A SOM may be defined according to one or more of a subcarrier spacing, a transmission time interval (TTI) length, and/or one or more reliability aspects (e.g., HARQ processing aspects). A SOM may include a secondary control channel. A SOM may be used to refer to a specific waveform and/or may be related to a processing aspect (e.g., in support of coexistence of different waveforms in the same carrier using FDM and/or TDM). A SOM may be used in case coexistence of FDD operation in a TDD band is supported (e.g., in a TDM manner or similar). A first type of SOM may be used for accessing a first network slice and a second type of SOM may be used for accessing a second network slice. Multiple SOMs may be used simultaneously.

For single carrier operation, a WTRU and/or a base station device may utilize spectrum aggregation in order to implement a flexible radio access communication system. A WTRU and/or a base station device may support transmission and/or reception of one or more transport blocks over contiguous or non-contiguous sets of physical resource blocks (PRBs) within an operating band (e.g., the same operating band). A transport block may be mapped to one or more sets (e.g., separate sets) of PRBs.

A WTRU and/or a base station device may utilize multicarrier operation. For example, a WTRU and/or a base station device may utilize multicarrier operation using contiguous or non-contiguous spectrum blocks within an operating band (e.g., the same operating band) and/or across two or more operating bands. A WTRU and/or a base station device may utilize aggregation of spectrum blocks using modes (e.g., different modes, such as FDD and TDD) and using channel access methods (e.g., different channel access methods, such as licensed and/or unlicensed band operation) below 6 GHz.

A WTRU and/or a base station device may utilize high flexibility for spectrum aggregation. High flexibility for spectrum aggregation may not involve the use of additional channels and/or band combinations. For example, high flexibility for spectrum aggregation may not involve the use of additional channels and/or band combinations, given the use of efficient baseband filtering in the frequency domain.

A WTRU and/or a base station device may organize downlink and/or uplink transmissions into radio frames. The radio frames may be characterized by one or more fixed aspects (e.g., location of downlink control information) and/or one or more varying aspects (e.g., transmission timing, supported types of transmissions).

A WTRU and/or a base station device may utilize the basic time interval (BTI). BTI may be defined as a unit in time for defining or utilizing a SOM or transmission scheme. For example, a BTI may correspond to a symbol length such an OFDM symbol length. A BTI may be expressed in terms of an integer number of one or more symbols. A symbol duration may be a function of the subcarrier spacing applicable to the time-frequency resource. For FDD, subcarrier spacing may differ between the uplink carrier frequency $f_{UL}$ and the downlink carrier frequency $f_{DL}$ for a given frame.

Figure 4:
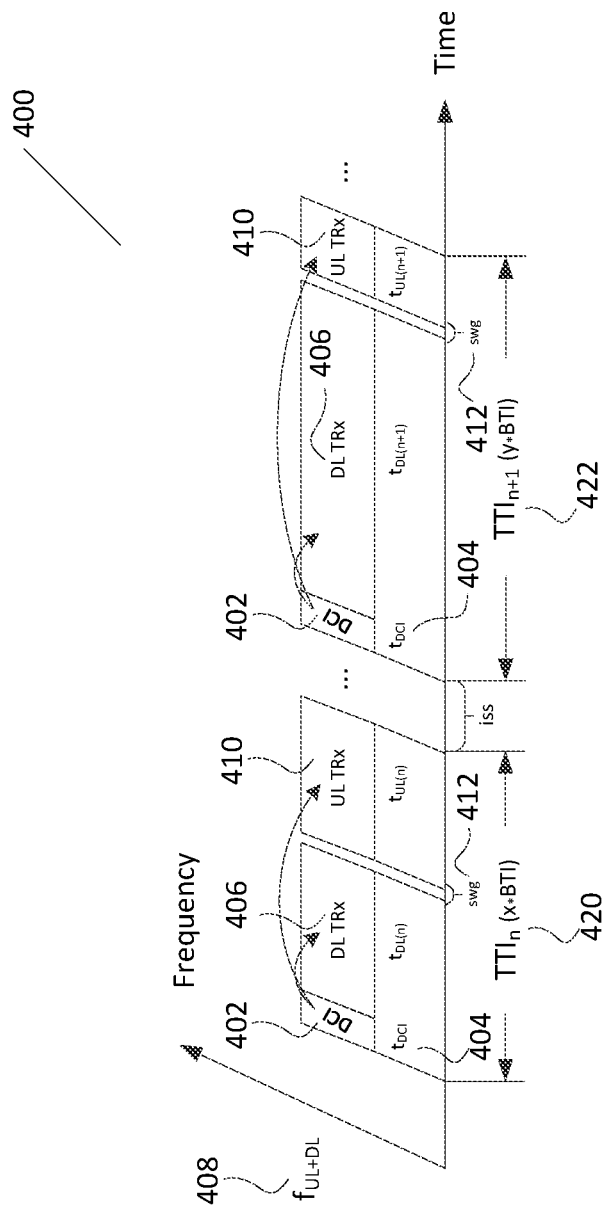
FIG. 4 illustrates timing relationships in an example time-division duplexing (TDD) frame structure.

A WTRU and/or a base station device may utilize a transmission time interval (TTI). A TTI may be the minimum transmission time and/or a minimum time supported by the system between transmissions (e.g., consecutive transmissions). One or more (e.g., each) of the transmissions may be associated with one or more (e.g., different) transport blocks (TBs) for the downlink ($TTI_{DL}$) and/or for the uplink (UL TRx), excluding a preamble (if applicable) and/or including control information (e.g., DCI for downlink and/or UCI for uplink). A TTI may be expressed in terms of integer number of one of more BTIs. For example, a TTI may be expressed in terms of $TTI_n$ (x*BTI) 420 and/or a TTI may be expressed in terms of $TTI_{n+1}$ (y*BTI) 422, as shown in FIG. 4. A TTI may be expressed in terms of $TTI_{DL(n)}$ (x*BTI) 420 and/or a TTI may be expressed in terms of $TTI_{DL(n+1)}$ (y*BTI) 422, as shown in FIG. 4.

Supported frame durations in the flexible radio access wireless communication system may enable alignment with the legacy LTE timing structure. For example, supported frame durations may include 100 µs, 125 µs (⅛ ms), 142.85 µs (1/7 ms is 2 nCP LTE OFDM symbols), and/or 1 ms.

Figure 5:
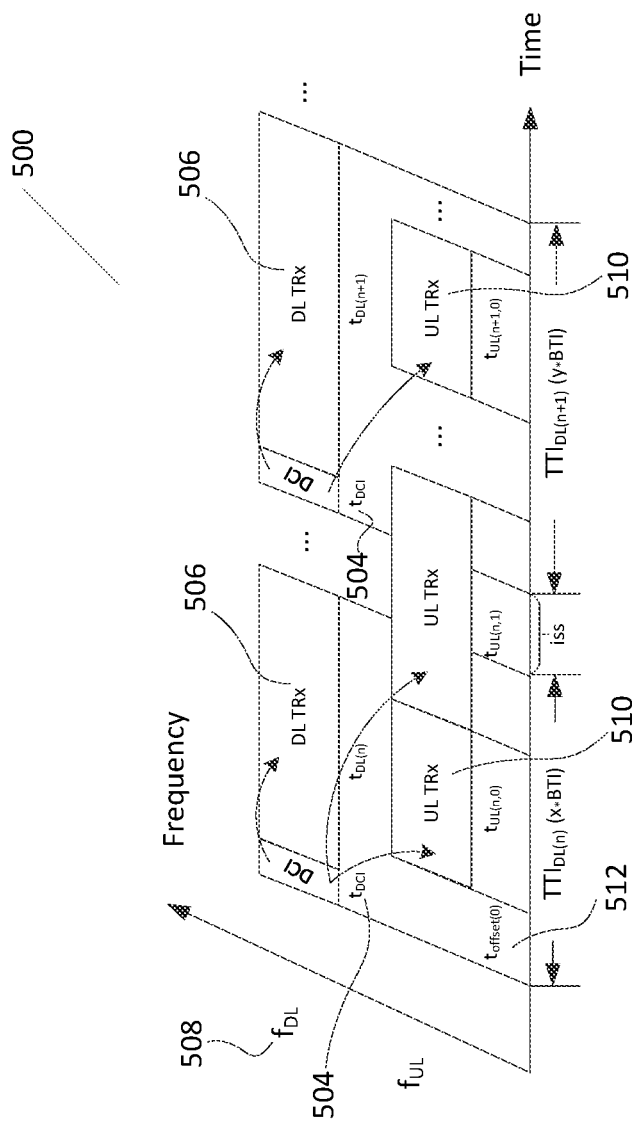
FIG. 5 illustrates timing relationships in an example frequency-division duplexing (FDD) frame structure.

FIG. 4 illustrates timing relationships in an example TDD frame structure 400 of the flexible radio access wireless communication system. FIG. 5 illustrates timing relationships in an example FDD frame structure 500 of the flexible radio access wireless communication system. A WTRU and/or a base station device may utilize a frame. The frame may start with downlink control information (DCI) (such as 402 of FIG. 4 and/or 502 of FIG. 5). The DCI may be of a fixed time duration $t_{dci}$ (e.g., 404 of FIG. 4 and/or 504 of FIG. 5). The time duration of the DCI may precede a downlink data transmission (e.g., DL TRx, such as DL TRx 406 and/or 506) for the concerned carrier frequency. The concerned carrier frequency may include $f_{UL+DL}$ 408 for TDD and/or $f_{DL}$ 508 for FDD. For TDD duplexing, a frame may include a downlink portion (e.g., DCI and/or DL TRx) and the frame may include an uplink portion (e.g., UL TRx, such as UL TRx 410 and/or 510). A switching gap (swg, such as swg 412) may precede the uplink portion of the frame, if present. For FDD duplexing, a frame may include a downlink reference TTI and/or the frame may include one or more TTIs for the uplink. The start of an uplink TTI may be derived using an offset ($t_{offset}$, such as $t_{offset}$ 512) applied from the start of the downlink reference frame that may overlap with the start of the uplink frame. For TDD, a WTRU and/or a base station device may utilize a D2D/V2x/Sidelink operation in the frame. For example, for TDD, D2D/V2x/Sidelink operation in the frame may be supported by including respective downlink control and/or forward direction transmission in the DCI+DL TRx portion (if a semi-static allocation of the respective resources is used) or in the DL TRx portion (for dynamic allocation) and by including the respective reverse direction transmission in the UL TRx portion. For FDD, a WTRU and/or a base station device may utilize D2D/V2x/Sidelink operation in the UL TRx portion of the frame. For example, for FDD, D2D/V2x/Sidelink operation in the UL TRx portion of the frame may be supported by including respective downlink control, forward direction and reverse direction transmissions in the UL TRx portion (dynamic allocation of the respective resources may be used).

A WTRU and/or a base station device may utilize a scheduling function in the MAC layer. Scheduling modes that may be supported may include network-based scheduling for tight scheduling (e.g., tight scheduling in terms of resources, timing, and/or transmission parameters of downlink transmissions and/or uplink transmissions). Scheduling modes that may be supported may include WTRU-based scheduling for flexibility in terms of timing and/or transmission parameters. For network-based scheduling and/or WTRU-based scheduling, scheduling information may be valid for one or more TTIs. Network-based scheduling may enable the network to manage radio resources (e.g., the available radio resources assigned to different WTRUs). For example, network-based scheduling may enable the network to manage available radio resources assigned to different WTRUs to optimize the sharing of such resources. A WTRU and/or a base station device may utilize dynamic scheduling. WTRU-based scheduling may enable the WTRU to access (e.g., opportunistically access) uplink resources with minimal latency on a per-need basis. WTRU-based scheduling may enable the WTRU to access uplink resources within a set of shared and/or dedicated uplink resources (e.g., dynamically or fixed uplink resources) assigned by the network.

A WTRU and/or a base station device may utilize synchronized and/or unsynchronized opportunistic transmissions. A WTRU and/or a base station device may utilize contention-based transmissions and/or contention-free transmissions. The association of data available for transmission and/or available resources for uplink transmissions may be supported. A WTRU and/or a base station device may utilize multiplexing of data with one or more (e.g., different) QoS requirements within a transport block (e.g., the same transport block). For example, a WTRU and/or a base station device may utilize multiplexing of data with one or more QoS requirements within a transport block as long as such multiplexing does not introduce a negative impact to the service with the most stringent QoS requirement and/or does not introduce unnecessary waste of system resources.

A WTRU and/or a base station device may utilize a resource element (RE). An RE may be used by the WTRU and/or the base station device as a resource unit (e.g., a minimum resource unit) in a physical resource grid. A WTRU and/or a base station device may define one or more of REs in a physical resource grid. An RE may be, and/or may include, one or more of the following. An RE may be and/or may include a subcarrier of a multi-carrier waveform in a time symbol (e.g., OFDM, filtered OFDM, filter bank multi-carrier; FBMC). For example, an RE may be and/or may include a time symbol if the waveform is based on a single carrier. An RE may be and/or may include a sequence of a modulated symbol in which multiple sequences may be used to carry data symbols. For example, a modulated symbol may carry one or more sequences. Each sequence may be used to transmit a data symbol (e.g., QPSK, 16QAM, 64QAM). An RE may be and/or may include a resource unit that may carry a data symbol.

A waveform, multiplexing scheme, and modulation scheme may be used interchangeably. A time symbol of a waveform, a modulated symbol, OFDM symbol, filtered OFDM symbol, FBMC symbol, and a time symbol may be used interchangeably. A data symbol, a constellation, QPSK, QAM, and offset QAM may be used interchangeably.

Figure 6:
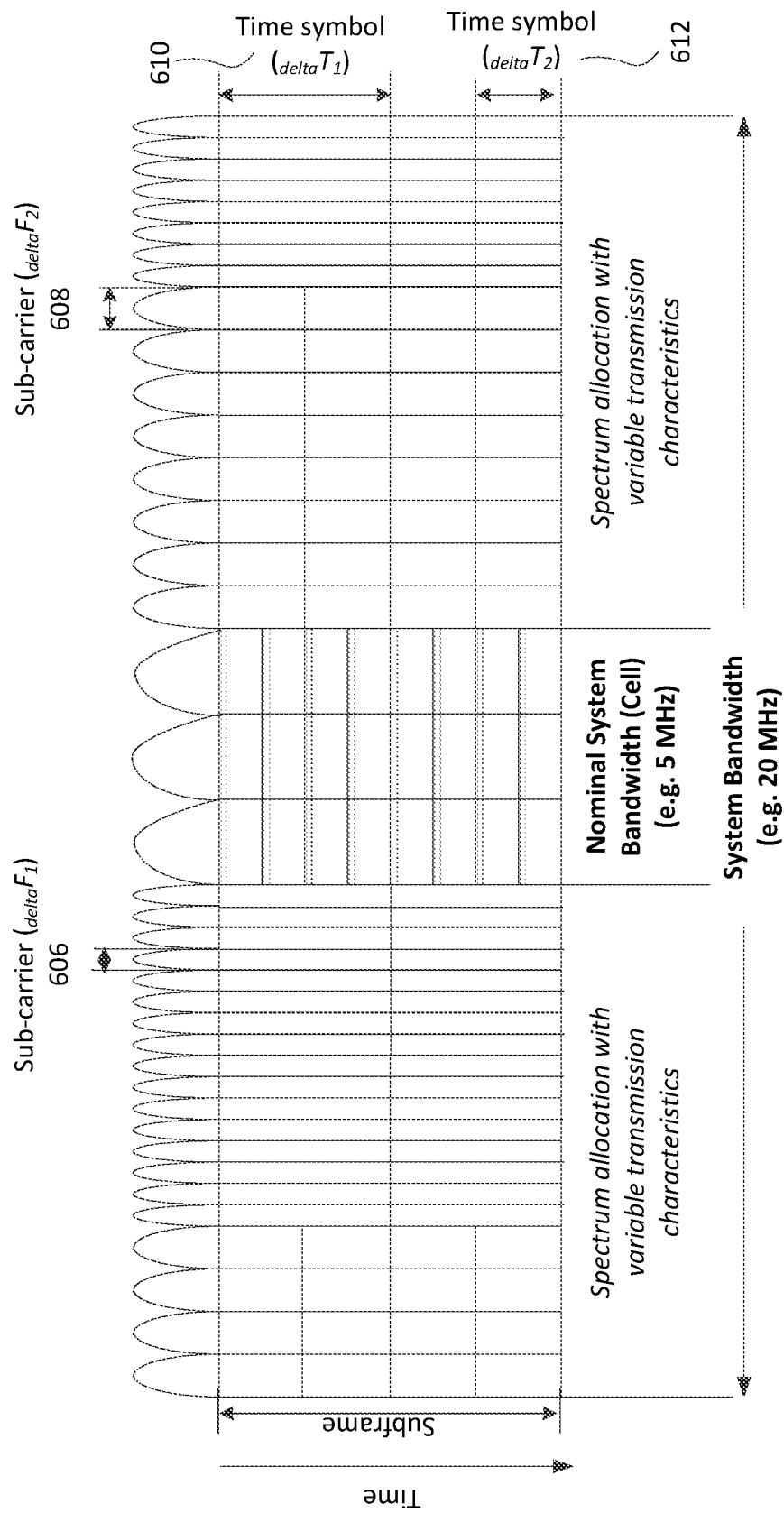
FIG. 6 illustrates an example of physical resource definition with a flexible system configuration.

A WTRU and/or a base station device may utilize one or more RE types. The WTRU and/or a base station device may determine an RE type based on a frequency space (e.g., subcarrier spacing) and/or a time length (e.g., symbol length). The WTRU and/or a base station device may determine the frequency space and/or time length of an RE based on the frequency location. As illustrated in FIG. 6, an RE in a first frequency resource may be defined with a frequency space $_{delta}F_1$ 606 and/or time length $_{delta}T_1$ 610. An RE in a second frequency resource may be defined with a frequency space $_{delta}F_2$ 608 and/or time length $_{delta}T_2$ 612.

A resource block (RB) may be a set of REs. A WTRU and/or a base station device may use one or more RB types. For example, a resource block may be defined as one or more (e.g., a combination of one or more) REs in frequency ($N_{RE,f}$) and/or a number of REs in time ($N_{RE,t}$). The WTRU and/or a base station device may determine the number REs in time and/or frequency based on the RB types.

A WTRU and/or a base station device may use one or more RB types. The WTRU and/or a base station device may associate a (e.g., each) RB type with a transmission mode (or scheme, SOM). The WTRU and/or a base station device may configure the transmission mode (or scheme, SOM) via a higher layer signaling and/or a broadcast signaling. The WTRU and/or a base station device may determine the transmission mode (or scheme, SOM) based on WTRU capability. The transmission mode (or scheme, SOM) may be indicated from an associated downlink control channel. The WTRU and/or a base station device may determine the transmission mode (or scheme, SOM) based on the time/frequency location of the associated downlink control channel. The WTRU and/or a base station device may determine the transmission mode (or scheme, SOM) based on a downlink control candidate index (e.g., search space location).

A WTRU and/or a base station device may determine a time and frequency location. For example, the WTRU and/or a base station device may determine a time and frequency location based on the determined RB type that a WTRU may receive and/or that a WTRU may need to receive (and/or monitor, decode, measure, etc.). For example, the WTRU and/or a base station device may determine the RB type based on a time and/or frequency location. A WTRU may be informed of the time and/or frequency location of an RB type that the WTRU may need to receive. An RB may include a one or more (e.g., a set of) REs. The REs in an RB (and/or an RB type) may be the same type of REs (e.g., the same frequency spacing and/or time length). An RB (and/or RB pairs) may be used as a resource unit. For example, an RB (and/or RB pairs) may be used as a minimum resource unit, to schedule a data transmission.

A transmission mode, transmission scheme, and SOM may be used interchangeably.

A WTRU and/or a base station device may determine an RB type. For example, the WTRU and/or the base station device may determine an RB type based on one or more of a number of REs in frequency, a number of REs in time, and/or an RE type. The WTRU and/or a base station device may associate the RE type with the RB type. If a network (and/or an eNB, system, etc.) uses a type of RE, the WTRU and/or a base station device may determine the RB type based on a number of REs in frequency and/or a number of REs in time. Table 1.0 illustrates an example of RB types. An RB type may be determined based on a number of REs in time and/or frequency, subcarrier spacing of an RE, and/or time symbol length of an RE.

One or more RB types may be defined. For example, one or more RB types may be defined with a time symbol (e.g., a single time symbol) with one or more subcarriers that may be used for a traffic type (e.g., a defined traffic type) that may use a low latency connection. One or more RB types may be defined with a subcarrier (e.g., a single subcarrier) with one or more time symbols that may be used for a defined traffic type that may use narrowband transmission. One or more RB types may be defined with one or more time symbols and one or more subcarriers that may be used for a traffic type (e.g., a defined traffic type) that may be characterized by high throughput performance.

TABLE 1.0

| | $N_{RE,f}$ | $N_{RE,t}$ | $delta F_x$ | $delta T_y$ |
|---|---|---|---|---|
| RB type-A | 120 | 1 | 1.5 kHz | 667 μs |
| RB type-B | 12 | 14 | 15 kHz | 66.7 μs |
| RB type-C | 1 | 80 | 180 kHz | 5.56 μs |
| RB type-D | 8 | 10 | 180 kHz | 5.56 μs |

Figure 7:
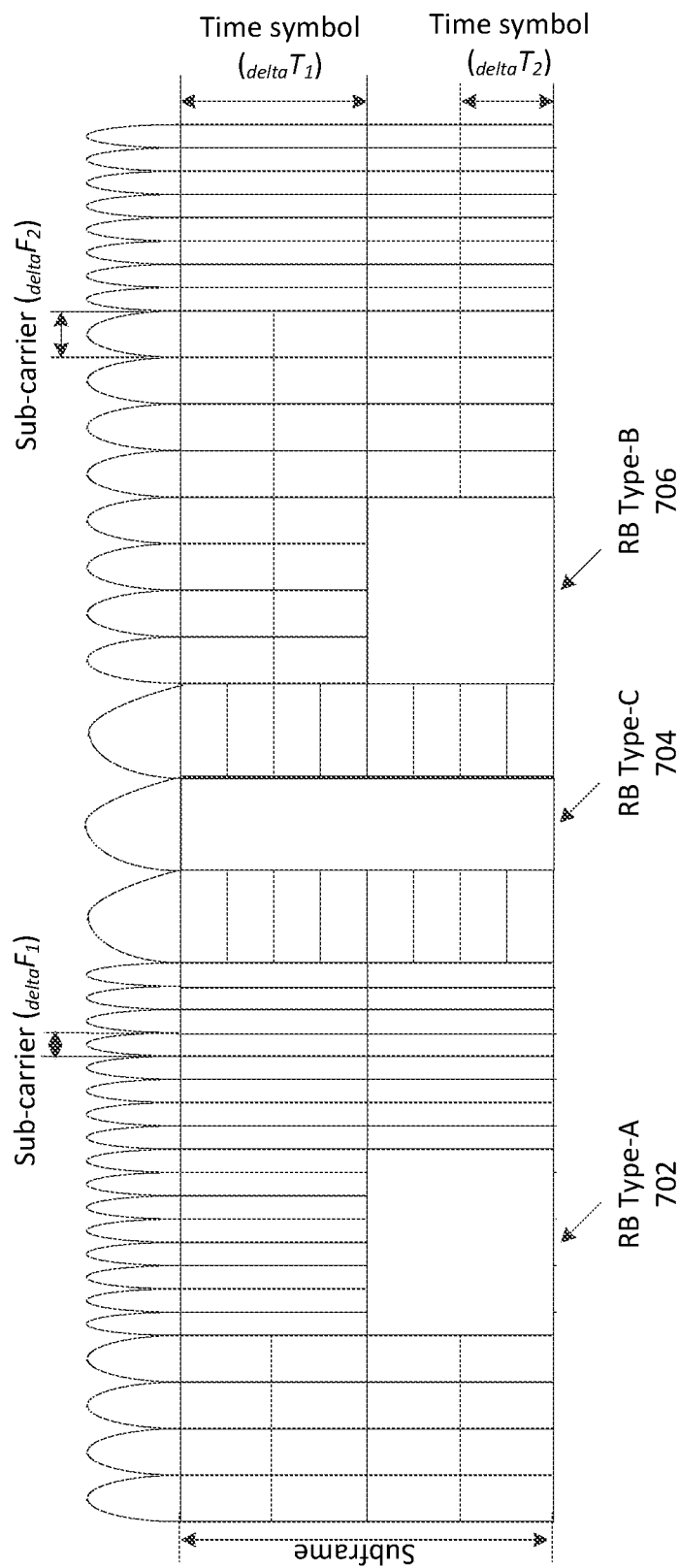
FIG. 7 illustrates an example of multiplexing of multiple resource block (RB) types in a subframe.

A WTRU and/or a base station device may multiplex one or more RB types. For example, one or more RB types may be multiplexed in a subframe. A subframe may be a predefined time period and/or a frequency bandwidth. A subframe may be defined as a set of RBs. FIG. 7 illustrates an example of multiplexing of one or more RB types in a subframe. For example, FIG. 7 illustrates an example of multiplexing RB Type-A 702, RB Type-B 704, and/or RB Type-C 706.

A WTRU and/or a base station device may determine the RB type in a subframe, based on a frequency location of the RB. The RB type in a subframe may be determined based on a time/frequency location of the RB. The RB type in a subframe may be determined based on a WTRU scheduled in the RB. For example, a WTRU may be configured with an RB type (e.g., a determined RB type) for data transmission/reception. The scheduled RB may be determined as the configured RB type for the WTRU.

A WTRU and/or a base station device may define an RB as a chunk of time and/or as frequency resources. The WTRU and/or a base station device may determine the number of REs for a RB, based on the subcarrier number and/or the number of modulated symbols within the chunk of time and/or frequency resources. The number of REs in a RB may be determined based on a type of modulation (e.g., OFDM, FBMC, etc.).

A WTRU and/or a base station device may use one or more downlink control channels (and/or downlink control channel types). For example, one or more downlink control channels (and/or downlink control channel types) may be used based on one or more of a traffic type for a data channel, an information type carried in the control channel, a reference signal, RB types used for the downlink control channel transmission, SOM, and/or WTRU types (or categories) that may receive or monitor the control channel. A downlink control channel may be interchangeably used as a downlink control channel type, control channel, and control channel type.

A WTRU and/or a base station device may define (e.g., and/or determine and/or use) a downlink control channel. For example, a downlink control channel may be defined, determined, and/or used based on a traffic type of the data channel scheduled by the downlink control channel. The WTRU and/or a base station device may use a first type of downlink control channel for a first traffic type (e.g., delay tolerant traffic). The WTRU and/or a base station device may use a second type of downlink control channel for a second traffic type (e.g., low latency traffic). The traffic type may be a data traffic that may use a low latency connection. The low latency connection may be referred to as a HARQ timing (or HARQ round trip time) that may be less than a predefined threshold. Round trip delay may be less than a predefined threshold. The traffic type may be a data traffic that may use a narrowband transmission. The traffic type may be a data traffic that may use a transmission with a high reliability. The traffic type may be a control traffic that may carry broadcast or multicast information. The traffic type may be a control and/or data traffic that may be transmitted and/or received between WTRUs.

A WTRU and/or a base station device may define (e.g., and/or determine and/or use) a downlink control channel, based on a WTRU capability. A first downlink control channel type may be used for a WTRU with a limited WTRU capability. A second downlink control channel type may be used for a WTRU with a full WTRU capability. The WTRU capability may include a supportable bandwidth (e.g., RF and/or baseband bandwidth supported by the WTRU). The WTRU capability may include a number of receive antennas (e.g., the number of RF chains or antennas at the WTRU receiver). The WTRU capability may include a number of transmit antennas (e.g., the number of RF chains or antennas at the WTRU transmitter). The WTRU capability may include a receiver beamforming capability. The WTRU capability may include a multiple antenna receiver type.

A WTRU and/or a base station device may define a downlink control channel, based on a reference signal. For example, a first downlink control channel may be associated with a first type of reference signal (e.g., cell-specific). A second downlink control channel may be associated with a second type of reference signal (e.g., WTRU-specific).

A WTRU and/or a base station device may define a control resource element (CRE). A CRE may be defined with a group of one or more REs. The CRE may be used interchangeably with resource element group (REG) and enhanced REG (EREG).

A WTRU and/or a base station device may define (and/or determine) a CRE with a fixed number of REs. For example, a CRE may include $N_{RE,C}$ REs. $N_{RE,C}$ may be a nominal number or a number of available REs. $N_{RE,C}$ may be a nominal number and the number of available REs for a CRE may be equal to or smaller than $N_{RE,C}$. For example, if one or more REs or a CRE are reserved for a higher priority channel (e.g., reference signal, synchronization signal, broadcasting signal), the number of available REs for a CRE may be smaller than $N_{RE,C}$. The available RE for a CRE may be referred to as an RE, which may be used for the control channel. The configuration of a higher priority signal may be known to a WTRU.

A WTRU and/or a base station device may define a CRE with a variable number of REs. For example, the WTRU and/or the base station device may determine the number of REs per CRE, based on an RE type for the REs in the associated CRE. A CRE that includes a first type of REs may be defined with a first number of REs (e.g., $N_{RE,C1}$). A CRE that includes a second type of REs may be defined with a second number of REs (e.g., $N_{RE,C2}$). The values of $N_{RE,C1}$ and $N_{RE,C2}$ may be different and may be preconfigured and/or predefined. The number of REs per CRE may be determined based on an RB type. For example, the number of REs per CRE may be determined based on an RB type of an RB in which the CRE may be located. A CRE in a first type of RB may be defined with a first number of REs. A CRE in a second type of RB may be defined with a second number of REs. The number of REs per CRE may be determined based on an index of the CRE. One or more CREs may be defined for a time cycle (e.g., TTI, subframe, radio frame). The number of REs for a CRE may be defined as a function of the CRE index. The number of REs per CRE may be determined based on a number of available REs within an RB.

A WTRU and/or a base station device may use one or more CREs. A (e.g., each) CRE used by the WTRU and/or the base station device may include a mutually orthogonal set of REs.

A WTRU and/or a base station device may use one or more CRE types. The CRE type may be determined based on a control channel type. A CRE type for a first control channel that uses a low latency connection may be defined and/or configured with REs located in a time symbol (e.g., in the same time symbol). A CRE type for a second control channel that uses a narrowband transmission may be defined and/or configured with REs located in a subcarrier (e.g., in the same subcarrier).

A WTRU and/or a base station device may determine the CRE type based on an RB type. For example, the CRE type may be determined based on an RB type of the configured RBs for the control channel. One or more RBs may be configured for a control channel. The configured RBs may be determined as a defined RB type. The WTRU and/or the base station device may determine the CRE type, based on the RB type determined for the configured RBs for the control channel.

A WTRU and/or a base station device may determine the CRE type based on an RE type. For example, the CRE type may be determined based on an RE type of REs that may be grouped to form a CRE. If a CRE is defined and/or configured with REs that may be a defined RE type, the CRE type may be determined based on the RE type of the REs associated with the CRE.

A WTRU and/or a base station device may determine the CRE type based on a configuration. The CRE type may be configured via a higher layer signaling and/or a broadcast channel.

A WTRU and/or a base station device may determine the CRE type based on a WTRU capability and/or category. For example, if a WTRU (e.g., a defined WTRU capability and/or WTRU category) is configured to receive and/or is intended to monitor a downlink control channel, the CRE type for the downlink control channel may be determined based on the WTRU capability or category.

A WTRU and/or a base station device may determine the CRE type based on a traffic type. The traffic type may include one or more of a service type, a higher layer signaling type, and/or a transport block type.

A WTRU and/or a base station device may determine the CRE type based on a CP length used for a waveform.

A WTRU and/or a base station device may determine the CRE type based on a subframe type. The subframe type may be defined and/or configured based on a traffic type served in the subframe. For example, if a subframe is used to carry a first traffic type (e.g., low-latency traffic), the subframe type may be referred to as a first subframe type (e.g., low latency traffic subframe). The parameters for the first subframe type may be determined based on a configuration (e.g., a configuration associated with the first subframe). Parameters of each subframe type may be configured with the configuration associated with the subframe. The parameters may include one or more of a subcarrier spacing, a time symbol length, a number of subcarriers, a number of time symbols, and/or whether the subframe includes a defined broadcast signal.

Figure 8:
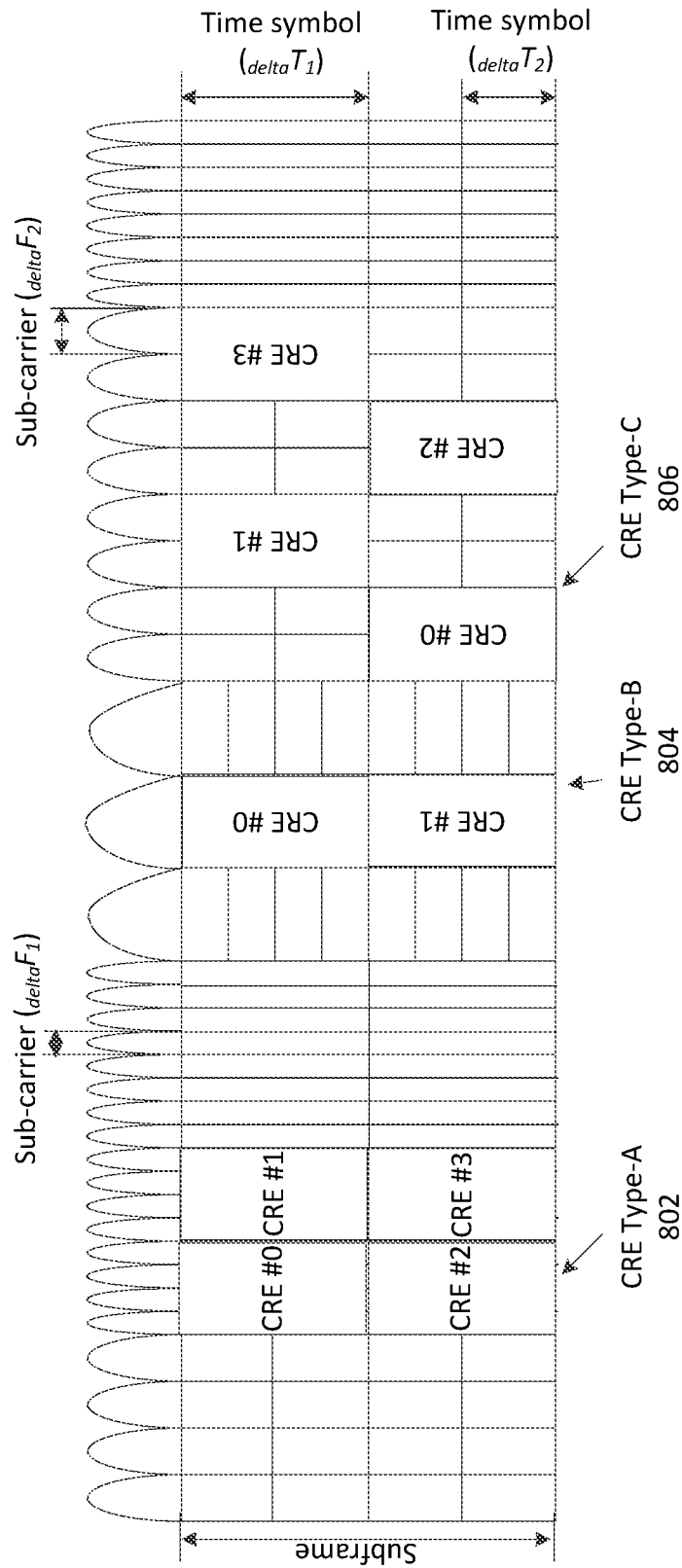
FIG. 8 illustrates an example of control resource element (CRE) types defined or configured based on RB types.

FIG. 8 illustrates an example of CRE types defined or configured based on RB types. For example, FIG. 8 illustrates an example of CRE Type-A 802, CRE Type-B 804, and/or CRE Type-C 806. CRE Type-A 802, CRE Type-B 804, and/or CRE Type-C 806 may be defined or configured based on RB types.

A WTRU and/or a base station device may use a single CRE type. A WTRU and/or a base station device may define or predefine a CRE. For example, a fixed nominal number of REs may be used for a CRE. The fixed nominal number of REs may be used for a CRE regardless of the RE type, control channel type, and/or WTRU capability (or WTRU category). A CRE may be defined and/or configured as an RE.

A WTRU and/or a base station device may define and/or configure a control resource element group (CREG). For example, a control resource element group (CREG) may be defined and/or configured with a group of one or more CREs. A CREG may be used interchangeably with control channel element (CCE) and/or enhanced CCE (ECCE). CREs with a same type may be grouped to form a CREG. A CREG type may be determined based on the CRE type. CREs may be grouped to form a CREG. For example, CREs may be grouped to form a CREG based on a CREG type.

A WTRU and/or a base station device may define and/or use one or more CREG types. The CREG type for a downlink control information (DCI) transmission and/or a downlink control channel may be determined based on a channel type (e.g., the associated channel type). For example, a CREG type used for a first channel type may be different from a CREG type used for a second channel type. A first CREG type (e.g., CREG Type-A 902) may be used to carry, transmit, receive, and/or monitor a DCI associated with a first channel type (e.g., low-latency channel). A second CREG type (e.g., CREG Type-B 904) may be used to carry, transmit, receive, and/or monitor a DCI associated with a second channel type (e.g., a narrowband transmission). A third CREG type (e.g., CREG Type-C 906) may be used to carry, transmit, receive, and/or monitor a DCI associated with a third channel type (e.g., broadband high throughput channel).

A WTRU and/or a base station device may determine a CREG type for a downlink control channel, based on a transmission mode. For example, a CREG type for a downlink control channel may be determined based on a transmission mode configured for a WTRU.

Figure 9:
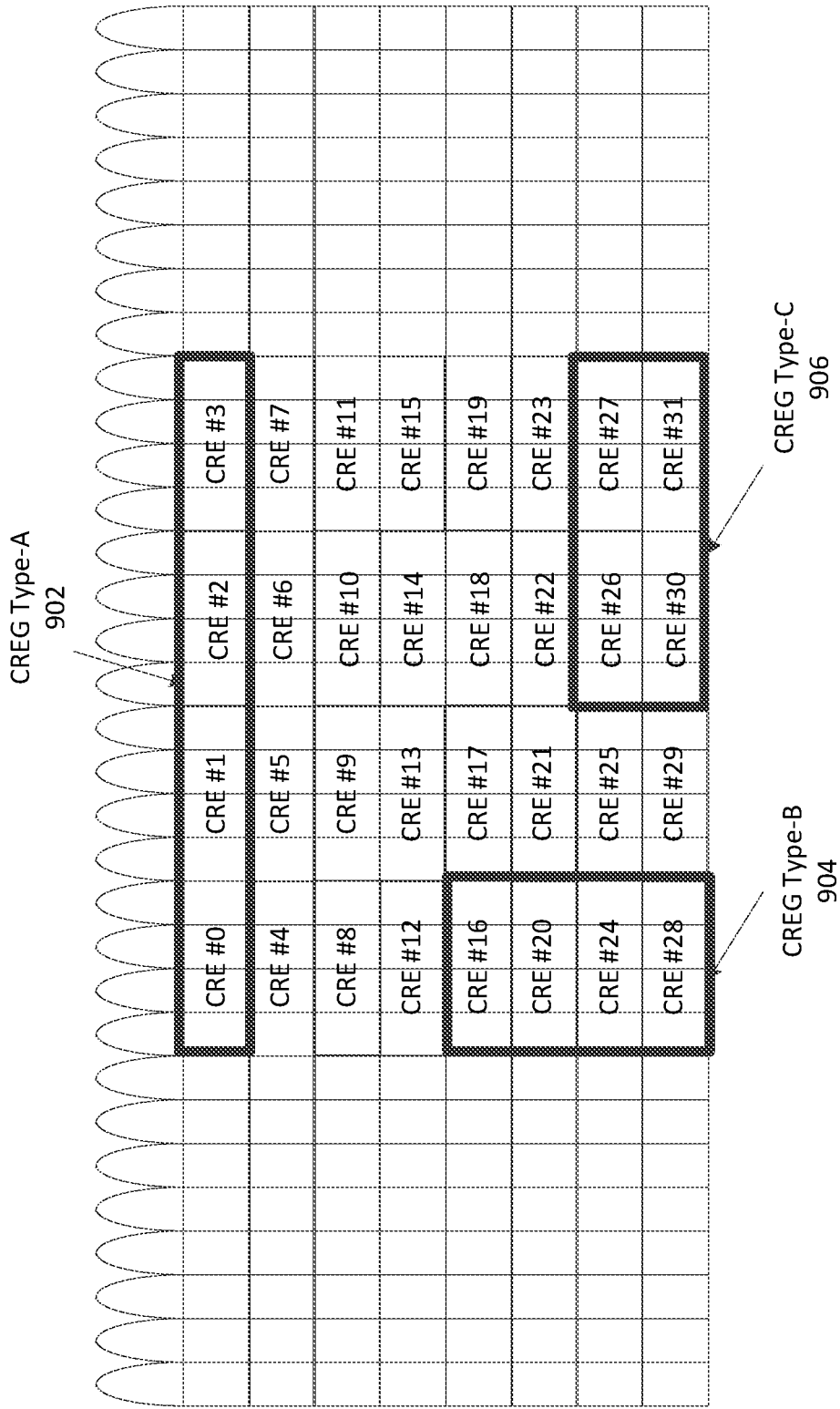
FIG. 9 illustrates example control resource element group (CREG) types.

A WTRU and/or a base station device may define, determine, and/or configure a CREG type, based on time and frequency locations. For example, a CREG type may be defined, determined, and/or configured based on the time and frequency locations of the CREs that are grouped to form the CREG. FIG. 9 illustrates example CREG types. A CREG type may be defined and/or configured with CREs that may be located in the same time symbol and/or that may be defined in adjacent time symbols. For example, a CREG type (e.g., CREG Type-A) may use a low-latency transmission. A downlink control channel transmission in one or more CREGs transmitted in a smaller number of time symbols may reduce the transmission delay.

A WTRU and/or a base station device may define and/or configure a CREG type with CREs that may be located in a same set of frequency (e.g., same set of subcarriers). For example, a CREG type (e.g., CREG Type-B) may use a downlink control channel transmission within a narrow bandwidth. A downlink control channel transmission in one or more CREGs transmitted in a smaller number of subcarriers may support narrowband transmission.

A WTRU and/or a base station device may define, determine, and/or configure a CREG, based on a set of REs. For example, a WTRU and/or a base station device may use a predetermined set of REs in one or more RBs. The set of REs for a CREG may be defined and/or determined based on the CREG index. A set of REs for a CREG that may be used for a first type of control channel may be located in a same time symbol and/or in adjacent time symbols. A set of REs for a CREG that may be used for a second type of control channel may be located in a same frequency. A set of REs for a CREG that may be used for a second type of control channel may be located in a same set of subcarriers and/or adjacent subcarriers. A set of REs for a CREG that may be used for a third type of control channel may be located in multiple RBs. The multiple RBs may be a same type of RB.

A WTRU and/or a base station device may use a reference signal to demodulate a CRE and/or a CREG. One or more reference signal structures may be used for a downlink control channel. A first reference signal structure may be a cell-specific reference signal. A cell-specific reference signal may be used for one or more downlink channels. For example, a reference signal may be used for a downlink control channel and/or a broadcast channel. A cell-specific reference signal may be transmitted over a system bandwidth. A cell-specific reference signal may be used for a downlink measurement (e.g., reference signal received power). A second reference signal structure may be a dedicated reference signal. A dedicated reference signal may be used for a specific downlink channel. For example, a dedicated reference signal may be used for a downlink control channel. A dedicated reference signal may be used for a data channel. A dedicated reference signal may be transmitted in a localized resource. A dedicated reference signal may be located within a resource that may be allocated, received, and/or decoded by a WTRU.

A WTRU and/or a base station device may use, define, and/or determine one or more reference signal types. For example, a reference signal type may be used, defined, and/or determined based on time and/or frequency locations of the reference signals (e.g., reference signal pattern in a time and frequency resource grid), a scrambling sequence, a number of antenna ports, and/or an antenna port number.

A WTRU and/or a base station device may determine a reference signal type for demodulating (and/or associated with) a CRE and/or a CREG. For example, a reference signal type for demodulating (and/or associated with) a CRE and/or a CREG may be determined as a function of CRE and/or CREG index. NT types of reference signals may be used. A reference signal type may be determined as a function of a CRE index and/or a CREG index. A modulo operation may be used to determine the reference signal type. A predefined mapping rule may be used to determine the reference signal type.

A WTRU and/or a base station device may determine a reference signal type associated with a CRE and/or a CREG based on a CRE type and/or a CREG type. For example, a first reference signal type may be used for a first CRE type (and/or CREG type). A second reference signal type may be used for a second CRE type (and/or CREG type).

A WTRU and/or a base station device may use a hierarchical downlink control channel structure. The WTRU and/or a base station device may use a common downlink control channel and/or one or more dedicated downlink control channels. The common DL control channel may be transmitted to and/or received by one or more WTRUs (e.g., all WTRUs), regardless of service type, traffic type, transmission type, WTRU category, and/or WTRU capabilities. The dedicated DL control channel may be transmitted to and/or received by a WTRU with a defined service type, traffic type, transmission type, WTRU category, and/or WTRU capability. A common DL control channel may be used interchangeably with a root DL control channel and a cell-specific control channel. A dedicated DL control channel may be used interchangeably with service type specific DL control channel, transmission type specific DL control channel, and WTRU-specific control channel.

Figure 10:
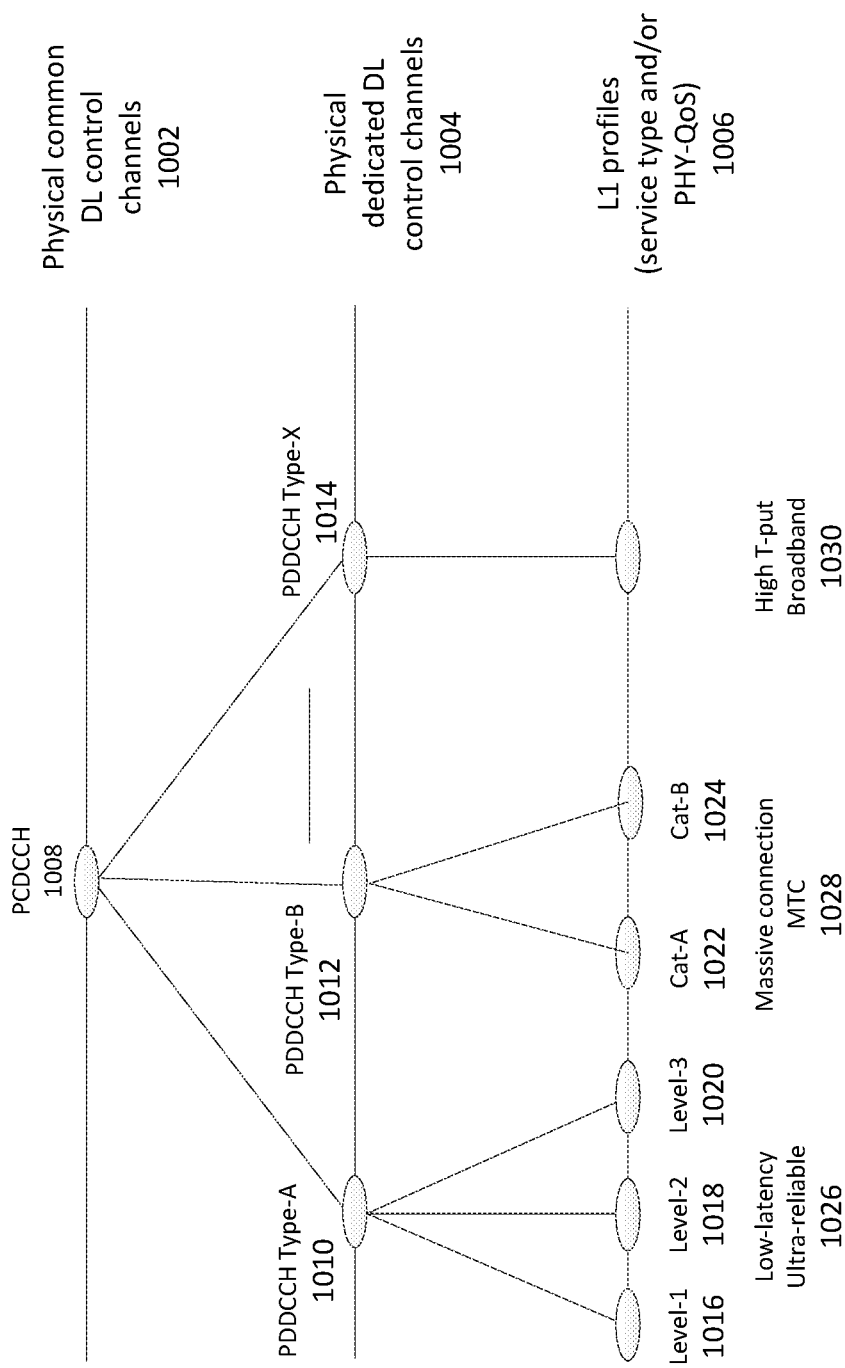
FIG. 10 illustrates an example hierarchical downlink control channel.

As shown in FIG. 10, two or more layers may be used by a WTRU and/or base station device to define a hierarchical DL control channel structure. For example, a physical common downlink control channel (PCDCCH) may be used as a common DL control channel. A physical dedicated downlink control channel (PDDCCH) may be used as a dedicated DL control channel.

A WTRU may receive and/or monitor one or more DL control channels in each layer. For example, a WTRU may need to receive and/or monitor one or more DL control channels in each layer in case multiple layers are used in a hierarchical DL control channel structure. A WTRU may receive and/or monitor PCDCCH 1008 in the first layer, as shown in FIG. 10. The first layer may be a common DL control channel, such as the Physical common DL control channel 1002. The WTRU may receive and/or monitor a PDDCCH Type (e.g., a PDDCCH Type-B 1012) in a second layer. The second layer may be a dedicated DL control channel, such as the Physical dedicated DL control channel 1004. The WTRU may receive and/or monitor a PDDCCH Cat (e.g., a PDDCCH Cat-A 1010) in a third layer. The third layer may be a profile, such as the L1 profile 1006. The L1 profile 1006 may include a service type and/or a PHY-QoS.

A WTRU and/or a base station device may configure a dedicated DL control channel (e.g., Physical dedicated DL control channel 1004) via a broadcast channel that may be scheduled from a common DL control channel (e.g., Physical common DL control channel 1002). PCDCCH 1008 may be used to schedule a data channel which may carry a broadcasting information. The broadcasting information may include the configuration of the dedicated DL control channel. A dedicated DL control channel may be configured via a WTRU-specific higher layer signaling.

A WTRU and/or a base station device may define a dedicated DL control channel (e.g., each dedicated DL control channel, such as each Physical dedicated DL control channel 1004), with one or more properties. One or more properties for dedicated DL control channels may be different according to the dedicated DL control type. These properties may include a waveform, numerologies (e.g., subcarrier spacing, time symbol length, and/or guard time or cyclic prefix length), an RE type (and/or RB type), a CRE type (and/or CREG type), a number of RBs used, a duty cycle, an associated reference signal, and/or a control channel type.

Figure 11:
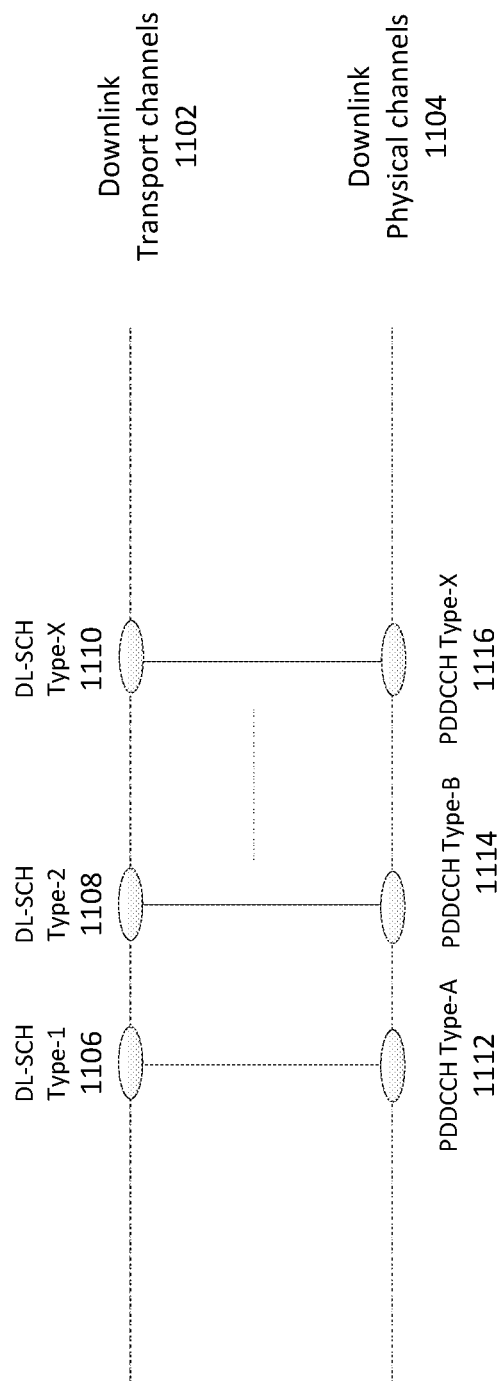
FIG. 11 illustrates an example mapping between a downlink (DL) transport channel and a DL control channel.

A WTRU and/or a base station device may use a common DL control channel (e.g., Physical common DL control channel 1002) to configure one or more dedicated control channels. A dedicated control channel for a WTRU to receive and/or monitor may be determined based on a WTRU capability and/or category. A dedicated control channel for a WTRU to receive and/or monitor may be determined based on a service type and/or traffic type. A dedicated control channel for a WTRU to receive and/or monitor may be determined based on a higher layer configuration (e.g., WTRU-specific higher layer signaling). A dedicated control channel for a WTRU to receive and/or monitor may be determined based on an indication. A dedicated control channel for a WTRU to receive and/or monitor may be determined based on an indication from the common DL control. A WTRU and/or a base station device may use group downlink control information to indicate which dedicated control channel is to be received and/or monitored (e.g., needs to be received and/or monitored) for the WTRUs receiving and/or monitoring the group downlink control information. A WTRU and/or a base station device may determine a dedicated control channel for a WTRU to receive and/or monitor based on a downlink transport channel type. For example, as illustrated in FIG. 11, one or more downlink transport channel types (e.g., DL-SCH Type-1 1006, DL-SCH Type-2 1008, and/or DL-SCH Type-x 1010) may be defined. Downlink transport channel types may be defined within a layer (such as the Downlink Transport channel 1102 layer). One or more of the downlink transport channel types may be associated with one or more dedicated DL control channel types (e.g., PDDCCH Type-A 1112, PDDCCH Type-B 1114, and/or PDDCCH Type-X 1116). Dedicated DL control channel types may be defined within a layer (such as the Downlink Physical channel 1104 layer).

A WTRU and/or a base station device may use a single common downlink control channel to support all service types, WTRU categories, WTRU capabilities, and/or L1 profiles.

Figure 12:
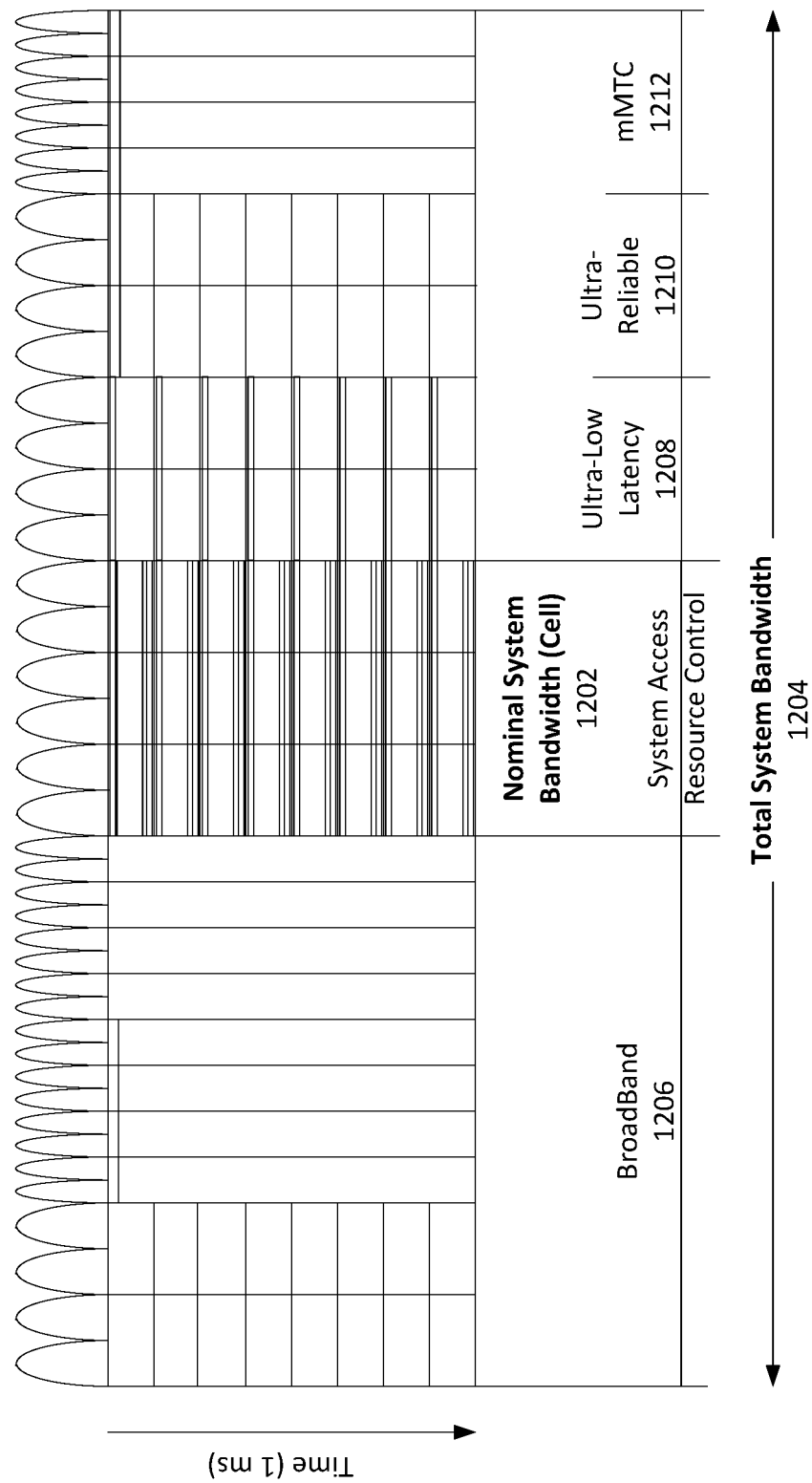
FIG. 12 illustrates an example of flexible spectrum allocation.

A nominal system bandwidth (such as the Nominal System Bandwidth 1202, as depicted in FIG. 12) may be smaller or narrower than a total system bandwidth (such as Total System Bandwidth 1204). For example, a nominal system bandwidth may have a bandwidth of 5 MHz, and/or a total system bandwidth may have a bandwidth of 20 MHz. A nominal system bandwidth that may be smaller or narrower than a total system bandwidth may be defined or used as a cell for cell selection or re-selection in a network. One or more cells may be used. A WTRU may determine one of the cells. A nominal system bandwidth may be defined or used for initial cell access. For example, if a WTRU determines a cell, the WTRU may receive one or more downlink signals in the nominal system bandwidth. The one or more downlink signals may include broadcast information that may be used to access the cell, higher layer signaling (e.g., WTRU-specific) for a RRC connection, a reference signal or reference signals for measurement and/or synchronization, and/or a synchronization signal for time and/or frequency synchronization. A WTRU and/or a base station device may define and/or use a nominal system bandwidth for reception or monitoring of a common DL control channel.

A WTRU and/or a base station device may define a nominal system bandwidth with a subset of the total system bandwidth. A WTRU and/or a base station device may use a frequency band other than the nominal system bandwidth based on configurations indicated or received from the nominal system bandwidth. A common DL control channel may be transmitted from a base state device (e.g., an eNB) and/or received by a WTRU in a nominal system bandwidth (e.g., the Nominal System Bandwidth 1202). A WTRU and/or a base station device may configure a dedicated DL control channel in a frequency band within a total system bandwidth (e.g., the Total System bandwidth 1204). For example, a dedicated DL control channel for a control channel type (e.g., Type-A control channel) may be located in a frequency band (e.g., RBs) used and/or configured for the traffic type associated with the control channel type. A dedicated DL control channel for a traffic type (e.g., ultra-low latency) may be located in the frequency band assigned and/or used for the traffic type. One or more dedicated DL control channels may be located in a different frequency band that may be associated with the traffic type. A time/frequency location of a dedicated DL control channel may be predefined within a frequency band that may be configured for a traffic type and/or a service type. For example, if a WTRU receives a resource configuration for a traffic type and/or a service type the WTRU may need to receive, the time/frequency location of the dedicated DL control channel that may be associated with the traffic type and/or service type may be known to the WTRU.

A WTRU and/or a base station device may locate a nominal system bandwidth in a different frequency region (e.g., a set of RBs or a set of consecutive RBs). The WTRU and/or a base station device may locate a nominal system bandwidth in a different frequency region, based on one or more of a service type, a traffic type, WTRU categories, and/or a WTRU capability. For example, the nominal system bandwidth for a broadband service may be located in a different frequency region from the frequency region for a massive MTC (mMTC) service (e.g., mMTC 1212). A WTRU may find a nominal system bandwidth with a defined synchronization signal. For example, a WTRU and/or a base station device may use one or more synchronization signal types. The synchronization signal type to receive may be determined based on one or more of a service type, a traffic type, WTRU categories, and/or a WTRU capability. The nominal system bandwidth (e.g., number of RBs) may be different. For example, the nominal system bandwidth (e.g., number of RBs) may be different based on one or more of a service type, a traffic type, WTRU categories, and/or a WTRU capability.

A WTRU and/or a base station device may use an indication of a dedicated DL control channel configuration. For example, a WTRU and/or a base station device may use an explicit or implicit indication of a dedicated DL control channel configuration. The explicit or implicit indication of the dedicated DL control channel configuration may be dynamic. For example, in the nominal system bandwidth, a DCI transmitted in a common DL control channel may indicate the presence of a defined dedicated DL control channel in the same time period (and/or the same subframe, adjacent times, and/or adjacent subframes). Based on the indication, a WTRU that receives and/or monitors a traffic type that is associated with the defined dedicated DL control channel may monitor and/or receive the dedicated DL control channel indicated from the DCI.

A WTRU and/or a base station device may use a DCI that may use a group RNTI and/or dedicated RNTI. For example, a DCI that may use a group RNTI and/or a dedicated RNTI may be used to indicate the presence of a defined dedicated DL control channel.

The DCI may include an identifier for the WTRU. For example, the DCI may include an identifier for the WTRU that may be different (e.g., shorter) than the RNTI that may be used to decode on the common DL control channel. The identifier may be included in the DCI payload of the dedicated DL control channel and/or may be used to mask a cyclic redundancy check (CRC) of the dedicated DL control channel, if present. The identifier may be, or may include, an index to a specific resource for the dedicated DL control channel.

A WTRU and/or a base station device may use a DCI for one or more dedicated DL control channels. For example, if multiple dedicated DL control channels are used, a WTRU and/or a base station device may use a separate DCI for each dedicated DL control channel. A (e.g., each) dedicated DL control channel may be indicated from a group RNTI (e.g., a distinct group RNTI). A DCI (e.g., a same DCI) may be used for one or more (e.g., all) dedicated DL control channels. For example, a bit field in a DCI may indicate which dedicated DL control channel presence is indicated. One or more WTRUs (e.g., all WTRUs) may monitor a DCI (e.g., the same DCI) in a common DL control channel. For example, one or more WTRUs may monitor the same DCI in a common DL control channel to receive an indication of a dedicated DL control channel.

A WTRU and/or a base station device may use a reference signal type (and/or structure or sequence) to indicate the presence of a dedicated DL control channel. The WTRU and/or a base station device may transmit a reference signal and/or a sequence in a predefined (e.g., known) location. For example, the reference signal and/or a sequence may be transmitted in the predefined location if a defined dedicated DL control channel is transmitted. Otherwise, the WTRU and/or a base station device may use the predefined or known location for the reference signal and/or a sequence for other downlink signal transmission.

A WTRU and/or a base station device may use a subframe number, radio frame number, and/or other parameters to determine the presence of a defined dedicated DL channel. The presence of a dedicated DL control channel may imply that a WTRU may attempt to decode, monitor, or receive the dedicated DL control channel. For example, the presence of a dedicated DL control channel may imply that a WTRU associated with the dedicated DL control channel may attempt to decode, monitor, or receive the dedicated DL control channel.

A WTRU and/or a base station device may use a DL control channel candidate. The DL control channel candidate may be used interchangeably with control channel (CC) candidate, CC decoding candidate, CC monitoring candidate, and CC candidate. A CC candidate may be defined and/or configured as one or more CREGs. A CC candidate may carry a DCI. A CC candidate type may be defined or configured based on CRE type and/or CREG type used.

A WTRU and/or a base station device may use a search space. For example, a search space may be used wherein one or more CC candidates may be located. The number of CC candidates in a search space may be determined based on one or more of service types and/or traffic types. The service types and/or traffic types may include ultra-low latency 1208, ultra-reliable 1210, narrowband, and broadband 1206 high throughput services. The number of CC candidates in a search space may be determined based on a WTRU capability and/or category. The WTRU capability and/or category may include one or more of supportable uplink and/or downlink bandwidth, number of carriers, number of transmit and/or receive antennas, and/or receive processing time. The number of CC candidates in a search space may be determined based on a time and/or frequency resource. The time and/or frequency resource may be configured for a control channel in which the search space is located. For example, a configuration with a larger frequency resource (e.g., RBs) may have a larger CC candidate as compared with that of a configuration with a smaller frequency resource. A WTRU and/or a base station device may determine the number of CC candidates in a search space based on an associated reference signal type. For example, a search space associated with a first reference signal type may have a smaller number of CC candidates as compared with a search space associated with a second reference signal type. The reference signal type herein may be replaced by CRE type, CREG type, or RB type.

A search space associated with a defined service type (e.g., ultra-low latency) may include a smaller number of CC candidates (e.g., a single CC candidate). A search space associated with another service type (e.g., narrowband service) may include a larger number of CC candidates (e.g., fifty CC candidates). A search space associated with a defined service type may include CC candidates that may use a same type of CRE and/or CREG.

A WTRU may attempt to decode, monitor, and/or receive one or more (e.g., all) CC candidates in a search space. For example, a WTRU may attempt to decode, monitor, and/or receive one or more (e.g., all) CC candidates in a search space that may be associated with and/or configured to the WTRU. A WTRU may attempt to decode, monitor, and/or receive a subset of CC candidates in a search space that may be associated with and/or configured to the WTRU based on one or more of a service type (and/or a traffic type), a WTRU capability (and/or a WTRU category), and/or an associated reference signal type.

A search space may be defined and/or used for a subset of downlink control channels and/or dedicated DL control channels. For example, the search space may be configured and/or used for a subset of channel types. The search space may be configured and/or used for a subset of CRE and/or CREG types. For example, the search space may be used for CREG type-B and type-C. The search space may be used for CREG type-B and type-C, while no search space may be used for CREG type-A.

One or more search spaces may be configured and/or used for a WTRU. A (e.g., each) search space may be associated with a defined service type and/or traffic type. A search space for a common DL control channel and one or more dedicated DL control channels may be configured and/or used for a WTRU. The search space for a common DL control channel (e.g., common search space) may be located in a nominal system bandwidth. The search spaces for one or more dedicated DL control channels (e.g., dedicated search spaces) may be located in a frequency band. For example, the search spaces for one or more dedicated DL control channels (e.g., dedicated search spaces) may be located in the associated frequency band of a (e.g., each) dedicated DL control channel. A WTRU may monitor and/or may attempt to decode a common search space in a subset of subframes (and/or radio frame, time frame, etc.). A WTRU may monitor and/or attempt to decode a dedicated search space in a subset of subframes (and/or radio frame, time frame, etc.). The dedicated search space may be configured. For example, the dedicated search space may be dynamically configured. An indication may be used for the presence of the dedicated search space.

A search space for a common DL control channel may be used. For example, a search space for a common DL control channel may be used for a specific service type, traffic type, WTRU category, and/or WTRU capability. One or more search spaces for a dedicated DL control channel may be used. For example, one or more search spaces for a dedicated DL control channel may be used for a specific service type, traffic type, WTRU category, and/or WTRU capability.

A WTRU and/or a base station device may configure one or more search spaces. A WTRU may monitor and/or attempt to decode configured search spaces. A (e.g., each) search space may include one or more CC candidates. The number of search spaces may change over time. For example, the number of search spaces may be determined based on a subframe number and/or radio frame number. The number of search spaces may be configured via higher layer signaling.

WTRU and/or a base station device may determine the number of CC candidates for a search space based on a number of search spaces. For example, the number of CC candidates for a search space may be determined based on the number of search spaces that a WTRU may monitor and/or attempt to decode in a same subframe and/or in a same time period. The number of CC candidates may be the same for search spaces configured. For example, $N_{CC,1}$ CC candidates may be in a (e.g., each) search space when $N_{S,1}$ search spaces are configured and/or used. $N_{CC,2}$ CC candidates may be in a (e.g., each) search space when $N_{S,2}$ search spaces are configured and/or used. $N_{CC,1}$ may be greater than $N_{CC,2}$. $N_{S,1}$ may be greater than $N_{S,2}$. The number of CC candidates may be determined (e.g., independently determined) per search space. The WTRU and/or a base station device may change the number of CC candidates for a search space as a function of the number of search spaces a WTRU may monitor and/or attempt to decode in a same time period. The number of CC candidate for a common search space may be the same regardless of the number of search spaces. The number of CC candidates for a dedicated search space may be determined based on the number of search spaces in a time period.

A WTRU and/or a base station device may configure a maximum number of search spaces. The WTRU and/or a base station device may configure a maximum number of search spaces simultaneously and/or in a same time period. For example, the maximum number of search spaces that may be configured (e.g., configured simultaneously and/or in a same time period) may be determined based on one or more of a WTRU category, a WTRU capability, a service type, a traffic type, a transmission type, and/or a subframe type. For example, one or more (e.g., two) search spaces may be the maximum number of search spaces for a MTC WTRU category. A WTRU and/or a base station device may use a single search space for narrowband service. A WTRU that may be capable of narrowband operation may support a single search space in a time period. A different search space may be multiplexed in time.

A WTRU and/or a base station device may configure one or more search spaces. A WTRU may monitor and/or attempt to decode a subset of configured search spaces. The subset of search spaces a WTRU may monitor and/or attempt to decode may be determined based on one or more of a WTRU category, a WTRU capability, a service type, a traffic type, a transmission type, and/or a subframe type. The subset may be determined based on a predefined priority rule of search space type. The search space type may be referred to as a search space in which information related a defined channel type may be transmitted.

A WTRU may receive one or more DCIs. For example, a WTRU may receive one or more DCIs associated with downlink transmission in one or more search spaces. A WTRU may receive one DCI for a service type and another DCI for another service type.

Control information may be carried in a time/frequency resource used for data transmission. One or more search spaces may be configured to a WTRU. The WTRU may monitor and/or attempt to decode a selected (and/or determined) subset of search spaces. The control information that may be transmitted in a non-selected (and/or non-determined) search space may be transmitted (and/or piggy-backed) in a data channel associated with a control channel transmitted in a selected (and/or determined) search space. A DCI transmitted in the selected (and/or determined) search space may indicate the presence of piggybacked control information. A DCI transmitted in the selected (and/or determined) search space may indicate the time/frequency location of a data channel that may carry the piggybacked control information. The piggybacked control information may be transmitted as a DCI in the selected (and/or determined) search space. A different RNTI may be used for a DCI in the selected search space and a DCI carrying piggybacked control information. A number of CC candidates may be increased if a WTRU monitors the DCI carrying piggybacked control information. Control information associated with a selected (and/or determined) search space and the piggybacked control information may be coded (e.g., jointly coded) and/or transmitted in a DCI.

A WTRU and/or a base station device may concatenate a DCI to one or more code blocks. For example, a DCI may be concatenated to one or more code blocks at the beginning or at the end of the code block. The DCI may be concatenated to one or more code blocks at the beginning or at the end of the code block of the transmission and/or to one or more transport blocks. The indication may be encoded (e.g., jointly encoded) with, and/or separately encoded from, the data in a (e.g., each) code block and/or transport block. The indication may be used to mask the cyclic redundancy check appended at the end of a (e.g., each) code block and/or transport block.

A WTRU and/or a base station device may use one or more code blocks with one or more associated DCI. A first DCI may be associated with a first code block. The first DCI may be transmitted in a control region (e.g., a DL control channel). A second DCI may be associated with a second code block. The second DCI may be transmitted in the data channel (or code block) that may be scheduled by the first DCI. A (e.g., each) code block may carry data information and/or a transport block. Each code block may carry a part of a transport block. A single HARQ-ACK may be transmitted for a transport block. One or more code blocks may be associated with a transport block. A (e.g., each) code block may include a CRC value. The first DCI that may be transmitted in a control region may include DCI fields, which may be a superset of the DCI fields of a subsequent DCI.

One or more DCIs may include a WTRU identity. For example, the first DCI may include a WTRU identity. One or more DCIs may not include a WTRU identity. For example, subsequent DCIs may not include the WTRU identity. The frequency resource of code blocks may be determined and/or scheduled by a first DCI. A subsequent DCI may include and/or indicate one or more of a presence of a subsequent code block, a payload size of a subsequent code block, and/or a time resource of a subsequent code block.

A WTRU and/or a base station device may use downlink control information may to schedule a downlink data and/or an uplink data. DCI may include one or more of a resource allocation of the associated data channel; a modulation and coding scheme; a starting BTI; an ending BTI; a transport block size; a HARQ process number; a new data indicator; a carrier indicator; a number of spatial layers; and/or an uplink power control field.

A WTRU and/or a base station device may use a CRC for a DCI. The CRC size may be determined based on the payload size of the DCI. For example, if a DCI payload size is smaller than a predefined threshold, a first CRC size (e.g., 8 bits) may be used. If a DCI payload size is larger than a predefined threshold, a second CRC size (e.g., 16 bits) may be used. A CRC may be used for a DCI if the payload size of the DCI is larger than a predefined threshold.

The size of CRC may be determined based on one or more of WTRU category, WTRU capability, service type, traffic type, transmission type, and/or subframe type. The CRC size may include a value of 0, which may be considered as no CRC. A CRC size of 0 may be used for a defined service type which may use a low latency connection (e.g., ultra-low latency service). A CRC size of 0 may be used for a DCI in a defined search space that may include a single CC candidate. A large CRC size may be used for a defined service type which may be characterized by high reliability (e.g., ultra-reliable transmission).

A WTRU and/or a base station device may use an indication (e.g., a start indication, a stop indication, etc.) to start and/or stop repetitive transmission of a data channel. For example, a transmission mode and/or scheme may use transmission (e.g., repetitive transmission) of uplink and/or downlink data transmission. An associated DCI may include an indication of start and/or stop of repetitive transmission. If a WTRU receives the indication of start and/or stop of repetitive transmission, the WTRU may start and/or stop transmitting and/or receiving repetitive signal transmissions. For example, if the WTRU receives an indication to start, the WTRU may start transmitting and/or receiving repetitive signal transmissions until the WTRU receives an indication to stop. A start and stop indication may be used for a DCI associated with a defined service type (e.g., ultra-reliable service).

One or more search spaces may be configured for a WTRU in order to implement a flexible radio access communication system. The WTRU may report associated channel status information for the configured search spaces. A WTRU may report a received signal power level of a (e.g., each) configured search space. A WTRU may report a search space which may have a highest receives signal power level. For example, a WTRU may report a preferred search space, which may have a highest receives signal power level. A WTRU may report a preferred CC candidate index within a search space.

A WTRU may report its capability of downlink control channel processing time in order to implement a flexible radio access communication system. For example, a WTRU may report a processing time of a (e.g., each) downlink control channel type. Based on the reported processing time, a timing relationship between control channel and data channel may be determined. A timing relationship between control channel and HARQ-ACK may be determined.

The processes and/or instrumentalities described herein may apply in any combination, may apply to other wireless technologies, and for other services.

A WTRU may refer to an identity of the physical device, or to the user's identity such as subscription related identities (e.g., MSISDN, SIP URI, etc.). A WTRU may refer to application-based identities. For example, a WTRU may refer to user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed:

1. A wireless transmit/receive unit (WTRU), comprising:
a processor; and
a receiver operatively coupled to the processor;
the processor and receiver configured to:
determine a first bandwidth region associated with a first subcarrier spacing and a first cyclic prefix, wherein the first bandwidth region is a subset of a system bandwidth and is used by the WTRU when initially accessing a cell;
receive a first downlink control channel transmission within the first bandwidth region;
receive configuration information related to: 1) a second downlink control channel transmission associated with a second bandwidth region of the system bandwidth and 2) a set of search spaces associated with the second bandwidth region, wherein the second bandwidth region is associated with a second subcarrier spacing and a second cyclic prefix; and
monitor for the second downlink control channel transmission in at least the set of search spaces associated with the second bandwidth region.

2. The WTRU of claim 1, wherein the configuration information related to the second downlink control channel transmission is associated with any of: a waveform, a numerology, a resource element type, a resource block type, or a control channel type.

3. The WTRU of claim 2, wherein the numerology comprises any of: the second subcarrier spacing, a time symbol length, or the second cyclic prefix.

4. The WTRU of claim 1, wherein the processor and the receiver are further configured to monitor for the second downlink control channel transmission in at least the set of search spaces based on an indication received via the first downlink control channel transmission.

5. The WTRU of claim 1, wherein each of the first and second bandwidth regions is associated with a respective set of contiguous physical resource blocks.

6. The WTRU of claim 1, wherein the first downlink control channel transmission is a common control channel transmission, and the second downlink control channel transmission is a dedicated control channel transmission.

7. The WTRU of claim 1, wherein the configuration information indicates a time and frequency location of the second downlink control channel transmission associated with the second bandwidth region.

8. The WTRU of claim 1, wherein the first and second bandwidth regions are each associated with a different numerology.

9. The WTRU of claim 1, wherein the configuration information is received using Radio Resource Control (RRC) signaling.

10. The WTRU of claim 1, wherein the receiver is further configured to receive the second downlink control channel transmission within the second bandwidth region.

11. The WTRU of claim 1, wherein the configuration information indicates the set of search spaces associated with the second bandwidth region is different from a set of search spaces associated with the first bandwidth region.

12. The WTRU of claim 1, wherein the configuration information indicates any of: the second subcarrier spacing associated with the second bandwidth region is different from the first subcarrier spacing associated with the first bandwidth region, or the second cyclic prefix associated with the second bandwidth region is different from the first cyclic prefix associated with the first bandwidth region.

13. The WTRU of claim 1, wherein the processor and receiver are configured to: when monitoring for the second downlink control channel transmission in at least the set of search spaces, attempt to decode or receive the second downlink control channel transmission within the second bandwidth region.

14. A method implemented in a wireless transmit/receive unit (WTRU) for wireless communications, the method comprising:
    determining a first bandwidth region associated with a first subcarrier spacing and a first cyclic prefix, wherein the first bandwidth region is a subset of a system bandwidth and is used by the WTRU when initially accessing a cell;
    receiving a first downlink control channel transmission within the first bandwidth region;
    receiving configuration information related to: 1) a second downlink control channel transmission associated with a second bandwidth region of the system bandwidth and 2) a set of search spaces associated with the second bandwidth region, wherein the second bandwidth region is associated with a second subcarrier spacing and a second cyclic prefix; and
    monitoring for the second downlink control channel transmission in at least the set of search spaces associated with the second bandwidth region.

15. The method of claim 14, wherein the configuration information related to the second downlink control channel transmission is associated with any of: a waveform, a numerology, a resource element type, a resource block type, or a control channel type.

16. The method of claim 15, wherein the numerology comprises any of: the second subcarrier spacing, a time symbol length, or the second cyclic prefix.

17. The method of claim 14, wherein the first and second bandwidth regions are each associated with a different numerology.

18. The method of claim 14, wherein the configuration information is received using Radio Resource Control (RRC) signaling.

19. The method of claim 14, further comprising:
    receiving the second downlink control channel transmission within the second bandwidth region.

20. The method of claim 14, wherein the monitoring for the second downlink control channel transmission in at least the set of search spaces comprises attempting to decode or receive the second downlink control channel transmission within the second bandwidth region.

* * * * *

UNITED STATES PATENT AND TRADEMARK OFFICE
CERTIFICATE OF CORRECTION

PATENT NO. : 11,133,901 B2
APPLICATION NO. : 15/754101
DATED : September 28, 2021
INVENTOR(S) : Moon-il Lee et al.

It is certified that error appears in the above-identified patent and that said Letters Patent is hereby corrected as shown below:

In the Specification

In Column 1, Line 3, below "WIRELESS SYSTEMS" insert --CROSS REFERENCE-- as heading.

In Column 1, Lines 11-16, below "reference herein" delete "CROSS REFERENCE
This application claims the benefit of U.S. Provisional Application No. 62/209,797 filed on Aug. 25, 2015, which is incorporated herein by reference as if fully set forth.".

In Column 9, Line 42, delete "1×," and insert --1X,--.

In Column 17, Line 36, delete "×2" and insert --X2--.

In Column 25, Line 1 (table 1.0), delete "NRE, f" and insert --NRE,f--.

In Column 25, Line 1 (table 1.0), delete "NRE, t" and insert --NRE,t--.

Signed and Sealed this
Fifteenth Day of November, 2022

Katherine Kelly Vidal
*Director of the United States Patent and Trademark Office*